United States Patent
Whitney et al.

(10) Patent No.: US 9,429,085 B2
(45) Date of Patent: Aug. 30, 2016

(54) AIRFLOW CONTROL SYSTEMS AND METHODS USING MODEL PREDICTIVE CONTROL

(71) Applicant: GM Global Technology Operations LLC, Detroit, MI (US)

(72) Inventors: Christopher E. Whitney, Commerce, MI (US); Ning Jin, Novi, MI (US); Robert J. Genslak, Macomb, MI (US); Jyh-Shin Chen, Troy, MI (US); Kevin C. Wong, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 326 days.

(21) Appl. No.: 13/911,148

(22) Filed: Jun. 6, 2013

(65) Prior Publication Data

US 2014/0311446 A1 Oct. 23, 2014

Related U.S. Application Data

(60) Provisional application No. 61/815,049, filed on Apr. 23, 2013.

(51) Int. Cl.
*F02D 9/08* (2006.01)
*F02D 41/00* (2006.01)
(Continued)

(52) U.S. Cl.
CPC ......... *F02D 41/0002* (2013.01); *F02D 11/105* (2013.01); *F02D 41/005* (2013.01);
(Continued)

(58) Field of Classification Search
CPC ................... F02D 9/08; F02D 11/105–11/108; F02D 41/00; F02D 41/18; F02D 41/182; F02D 41/20; F02D 41/0002; F02D 2041/001; F02D 2041/0017; F02D 2041/002; F02D 2041/1412; F02D 2041/1433; F02D 2041/1434; F02D 2041/1436; F02D 2041/1437; F02D 43/00; F02D 43/04; F02D 2200/1004; F02D 2200/0402
See application file for complete search history.

(56) References Cited

U.S. PATENT DOCUMENTS 4,161,929 A 7/1979 Nohira et al.
5,070,846 A 12/1991 Dudek et al.
(Continued)

FOREIGN PATENT DOCUMENTS

CN 1594846 A 3/2005
WO WO-03-065135 A1 8/2003

OTHER PUBLICATIONS

U.S. Appl. No. 14/675,860, filed Apr. 2001, Long et al.
(Continued)

*Primary Examiner* — Stephen K Cronin
*Assistant Examiner* — Kevin R Steckbauer

(57) ABSTRACT

A torque requesting module generates a first torque request for a spark ignition engine based on driver input. A torque conversion module converts the first torque request into a second torque request. A setpoint module generates setpoints for the spark ignition engine based on the second torque request. A model predictive control (MPC) module: identifies sets of possible target values based on the setpoints; generates predicted parameters based on a model of the spark ignition engine and the sets of possible target values, respectively; selects one of the sets of possible target values based on the predicted parameters; and sets target values based on the possible target values of the selected one of the sets. A first constraint module selectively sets a predetermined range for first one of the target values. The MPC module limits the first one of the target values to within the predetermined range.

20 Claims, 11 Drawing Sheets

(51) Int. Cl.
*F02D 41/22* (2006.01)
*F02D 11/10* (2006.01)
*F02D 37/02* (2006.01)
*F02D 41/14* (2006.01)
*F02B 37/18* (2006.01)
*F02M 25/08* (2006.01)

(52) U.S. Cl.
CPC ............. *F02D41/221* (2013.01); *F02B 37/18* (2013.01); *F02D 11/107* (2013.01); *F02D 37/02* (2013.01); *F02D 41/0007* (2013.01); *F02D 41/0087* (2013.01); *F02D 2041/001* (2013.01); *F02D 2041/1412* (2013.01); *F02D 2041/1433* (2013.01); *F02D 2250/18* (2013.01); *F02M 25/0809* (2013.01); *F02M 25/0836* (2013.01); *Y02T 10/42* (2013.01); *Y02T 10/47* (2013.01)

(56) References Cited

U.S. PATENT DOCUMENTS

| | | |
|---|---|---|
| 5,101,786 A | 4/1992 | Kamio et al. |
| 5,293,553 A | 3/1994 | Dudek et al. |
| 5,706,780 A * | 1/1998 | Shirakawa ............ F02D 41/005 123/381 |
| 5,727,528 A | 3/1998 | Hori et al. |
| 5,775,293 A | 7/1998 | Kresse |
| 5,921,219 A | 7/1999 | Frohlich et al. |
| 6,014,955 A | 1/2000 | Hosotani et al. |
| 6,155,230 A | 12/2000 | Iwano et al. |
| 6,532,935 B2 | 3/2003 | Ganser et al. |
| 6,606,981 B2 * | 8/2003 | Itoyama ................... 123/568.21 |
| 6,704,638 B2 | 3/2004 | Livshiz et al. |
| 6,714,852 B1 | 3/2004 | Lorenz et al. |
| 6,826,904 B2 | 12/2004 | Miura |
| 6,840,215 B1 | 1/2005 | Livshiz et al. |
| 6,985,809 B2 | 1/2006 | Yasui |
| 7,016,779 B2 | 3/2006 | Bowyer |
| 7,021,282 B1 | 4/2006 | Livshiz et al. |
| 7,051,058 B2 | 5/2006 | Wagner et al. |
| 7,076,953 B2 | 7/2006 | Kreso |
| 7,274,986 B1 | 9/2007 | Petridis et al. |
| 7,275,374 B2 | 10/2007 | Stewart et al. |
| 7,328,577 B2 | 2/2008 | Stewart et al. |
| 7,395,147 B2 | 7/2008 | Livshiz et al. |
| 7,400,967 B2 | 7/2008 | Ueno et al. |
| 7,433,775 B2 | 10/2008 | Livshiz et al. |
| 7,441,544 B2 * | 10/2008 | Hagari ........................... 123/434 |
| 7,472,692 B2 | 1/2009 | Nakagawa et al. |
| 7,614,384 B2 * | 11/2009 | Livshiz et al. ................ 123/399 |
| 7,650,225 B2 | 1/2010 | Nakagawa et al. |
| 7,703,439 B2 | 4/2010 | Russell et al. |
| 7,715,975 B2 | 5/2010 | Yamaoka et al. |
| 7,775,195 B2 | 8/2010 | Schondorf et al. |
| 7,783,409 B2 | 8/2010 | Kang et al. |
| 7,813,869 B2 | 10/2010 | Grichnik et al. |
| 7,885,756 B2 | 2/2011 | Livshiz et al. |
| 7,941,260 B2 | 5/2011 | Lee et al. |
| 7,967,720 B2 | 6/2011 | Martin et al. |
| 8,041,487 B2 | 10/2011 | Worthing et al. |
| 8,050,841 B2 | 11/2011 | Costin et al. |
| 8,073,610 B2 | 12/2011 | Heap et al. |
| 8,103,425 B2 | 1/2012 | Choi et al. |
| 8,103,428 B2 * | 1/2012 | Russ ....................... F02M 25/07 123/406.23 |
| 8,116,954 B2 | 2/2012 | Livshiz et al. |
| 8,176,735 B2 * | 5/2012 | Komatsu ................ F02B 37/013 123/562 |
| 8,255,139 B2 | 8/2012 | Whitney et al. |
| 8,307,814 B2 | 11/2012 | Leroy et al. |
| 8,447,492 B2 | 5/2013 | Watanabe et al. |
| 8,468,821 B2 * | 6/2013 | Liu ........................ F02B 37/004 60/600 |
| 8,483,935 B2 | 7/2013 | Whitney et al. |
| 8,560,204 B2 | 10/2013 | Simon, Jr. et al. |
| 8,739,766 B2 | 6/2014 | Jentz et al. |
| 8,862,248 B2 * | 10/2014 | Yasui .............................. 700/28 |
| 8,954,257 B2 | 2/2015 | Livshiz et al. |
| 9,052,997 B2 | 6/2015 | Ono |
| 9,062,631 B2 | 6/2015 | Kinugawa et al. |
| 9,075,406 B2 * | 7/2015 | Nakada ............... F02D 41/0007 |
| 9,127,614 B2 | 9/2015 | Ueno et al. |
| 9,145,841 B2 | 9/2015 | Miyazaki et al. |
| 9,175,628 B2 | 11/2015 | Livshiz et al. |
| 9,243,524 B2 | 1/2016 | Whitney et al. |
| 2002/0038647 A1 | 4/2002 | Tashiro et al. |
| 2002/0078924 A1 | 6/2002 | Yagi |
| 2002/0179050 A1 | 12/2002 | Soliman et al. |
| 2003/0074892 A1 | 4/2003 | Miura |
| 2003/0110760 A1 | 6/2003 | Shirakawa |
| 2003/0145836 A1 | 8/2003 | Linna et al. |
| 2004/0116220 A1 | 6/2004 | Yamamoto et al. |
| 2005/0065691 A1 | 3/2005 | Cho |
| 2005/0131620 A1 | 6/2005 | Bowyer |
| 2005/0166900 A1 | 8/2005 | Song et al. |
| 2005/0171670 A1 | 8/2005 | Yoshioka et al. |
| 2005/0193739 A1 | 9/2005 | Brunell et al. |
| 2005/0267608 A1 | 12/2005 | Nishira et al. |
| 2006/0137335 A1 | 6/2006 | Stewart et al. |
| 2006/0199699 A1 | 9/2006 | Berglund et al. |
| 2007/0068159 A1 | 3/2007 | Ueno et al. |
| 2007/0174003 A1 * | 7/2007 | Ueno ................... F02D 41/0002 701/104 |
| 2008/0127938 A1 | 6/2008 | Hagari |
| 2008/0271718 A1 | 11/2008 | Schondorf et al. |
| 2008/0308066 A1 | 12/2008 | Martin et al. |
| 2009/0018733 A1 | 1/2009 | Livshiz et al. |
| 2009/0033264 A1 | 2/2009 | Falkenstein |
| 2009/0037066 A1 | 2/2009 | Kuwahara et al. |
| 2009/0037073 A1 | 2/2009 | Jung et al. |
| 2009/0118968 A1 | 5/2009 | Livshiz et al. |
| 2009/0118969 A1 | 5/2009 | Heap et al. |
| 2009/0118972 A1 | 5/2009 | Baur et al. |
| 2009/0143959 A1 * | 6/2009 | Yamaoka et al. ............. 701/108 |
| 2009/0229562 A1 | 9/2009 | Ramappan et al. |
| 2009/0292435 A1 | 11/2009 | Costin et al. |
| 2010/0049419 A1 | 2/2010 | Yoshikawa et al. |
| 2010/0057283 A1 | 3/2010 | Worthing et al. |
| 2010/0057329 A1 | 3/2010 | Livshiz et al. |
| 2010/0075803 A1 | 3/2010 | Sharples et al. |
| 2010/0116249 A1 | 5/2010 | Guerrassi et al. |
| 2010/0116250 A1 | 5/2010 | Simon, Jr. et al. |
| 2010/0180876 A1 | 7/2010 | Leroy et al. |
| 2010/0211294 A1 * | 8/2010 | Soejima ........................ 701/108 |
| 2010/0263627 A1 | 10/2010 | Whitney et al. |
| 2010/0268436 A1 | 10/2010 | Soejima et al. |
| 2010/0280738 A1 | 11/2010 | Whitney et al. |
| 2011/0034298 A1 | 2/2011 | Doering et al. |
| 2011/0045948 A1 | 2/2011 | Doering et al. |
| 2011/0066308 A1 | 3/2011 | Yang et al. |
| 2011/0087421 A1 | 4/2011 | Soejima et al. |
| 2011/0100013 A1 | 5/2011 | Whitney et al. |
| 2011/0113773 A1 | 5/2011 | Liu et al. |
| 2011/0144838 A1 | 6/2011 | Matthews et al. |
| 2011/0264353 A1 | 10/2011 | Atkinson et al. |
| 2012/0065864 A1 | 3/2012 | Whitney et al. |
| 2012/0150399 A1 | 6/2012 | Kar et al. |
| 2012/0203434 A1 | 8/2012 | Sujan et al. |
| 2013/0032123 A1 | 2/2013 | Kinugawa et al. |
| 2013/0032127 A1 | 2/2013 | Jentz et al. |
| 2013/0060448 A1 | 3/2013 | Nakada |
| 2013/0080023 A1 | 3/2013 | Livshiz et al. |
| 2013/0104859 A1 * | 5/2013 | Miyazaki ............ F02D 41/0077 123/568.21 |
| 2013/0151124 A1 * | 6/2013 | Seiberlich et al. ........... 701/108 |
| 2013/0184961 A1 | 7/2013 | Kumar et al. |
| 2013/0213353 A1 * | 8/2013 | Rollinger et al. ............. 123/435 |
| 2014/0076279 A1 | 3/2014 | Livshiz et al. |
| 2014/0174413 A1 | 6/2014 | Huang et al. |
| 2014/0174414 A1 | 6/2014 | Huang et al. |
| 2014/0311446 A1 | 10/2014 | Whitney et al. |
| 2014/0316681 A1 * | 10/2014 | Whitney et al. ............... 701/108 |
| 2014/0316682 A1 | 10/2014 | Whitney et al. |

(56) References Cited

U.S. PATENT DOCUMENTS

| | | | |
|---|---|---|---|
| 2014/0316683 A1* | 10/2014 | Whitney et al. | 701/108 |
| 2015/0039206 A1 | 2/2015 | Storch et al. | |
| 2015/0275569 A1 | 10/2015 | LeBlanc | |
| 2015/0275711 A1 | 10/2015 | Whitney et al. | |
| 2015/0275771 A1 | 10/2015 | Pochner et al. | |
| 2015/0275772 A1 | 10/2015 | Long et al. | |
| 2015/0275783 A1 | 10/2015 | Wong et al. | |
| 2015/0275784 A1 | 10/2015 | Whitney et al. | |
| 2015/0275785 A1 | 10/2015 | Cygan, Jr. et al. | |
| 2015/0275786 A1 | 10/2015 | Jin et al. | |
| 2015/0275789 A1 | 10/2015 | Cygan, Jr. et al. | |
| 2015/0275792 A1 | 10/2015 | Genslak et al. | |
| 2015/0275794 A1 | 10/2015 | Verdejo et al. | |
| 2015/0275795 A1 | 10/2015 | Cygan, Jr. et al. | |
| 2015/0275796 A1 | 10/2015 | Pochner et al. | |
| 2015/0275806 A1 | 10/2015 | Genslak et al. | |

OTHER PUBLICATIONS

John C. G. Boot; "Quadratic Programming: Algorithms, Anomalies, Applications vol. 2 of Studies in mathematical and managerial economics"; North-Holland Publ.Comp., 1964; 213 pages.

N. Lawrence Ricker; "Use of quadratic programming for constrained internal model control"; Ind. Eng. Chem. Process Des. Dev., 1985, pp. 925-936.

C. E. Lemke; "A Method of Solution for Quadratic Programs"; Rensselaer Polytechnic Institute, Troy, New York, Published Online: Jul. 1, 1962, pp. 442-453.

U.S. Appl. No. 13/613,588, filed Sep. 13, 2012, Livshiz et al.
U.S. Appl. No. 13/613,683, filed Sep. 13, 2012, Livshiz et al.
Kolmanovsky, I., "Towards Engine and Powertrain Control Based on Model Predictive Control," (Sep. 28, 2012), Powerpoint presentation, 47 slides.
U.S. Appl. No. 14/309,047, filed Jun. 19, 2014, Jose C. Zavala Jurado et al.
U.S. Appl. No. 13/911,132, filed Jun. 6, 2013, Whitney et al.
U.S. Appl. No. 14/225,808, filed Mar. 26, 2014, Whitney et al.
U.S. Appl. No. 13/686,069, filed Nov. 27, 2012, Livshiz et al.
U.S. Appl. No. 13/911,121, filed Jun. 6, 2013, Whitney et al.
U.S. Appl. No. 13/911,156, filed Jun. 6, 2013, Whitney et al.
U.S. Appl. No. 14/032,508, filed Sep. 20, 2013, Storch et al.
U.S. Appl. No. 14/225,492, filed Mar. 26, 2014, Wong et al.
U.S. Appl. No. 14/225,496, filed Mar. 26, 2014, Pochner et al.
U.S. Appl. No. 14/225,502, filed Mar. 26, 2014, Long et al.
U.S. Appl. No. 14/225,507, filed Mar. 26, 2014, Jin et al.
U.S. Appl. No. 14/225,516, filed Mar. 26, 2014, Whitney et al.
U.S. Appl. No. 14/225,531, filed Mar. 26, 2014, Genslak et al.
U.S. Appl. No. 14/225,569, filed Mar. 26, 2014, Long et al.
U.S. Appl. No. 14/225,587, filed Mar. 26, 2014, Cygan Jr. et al.
U.S. Appl. No. 14/225,626, filed Mar. 26, 2014, Verdejo et al.
U.S. Appl. No. 14/225,817, filed Mar. 26, 2014, Cygan Jr. et al.
U.S. Appl. No. 14/225,891, filed Mar. 26, 2014, Genslak et al.
U.S. Appl. No. 14/225,896, filed Mar. 26, 2014, Cygan Jr. et al.
U.S. Appl. No. 14/226,006, filed Mar. 26, 2014, Pochner et al.
U.S. Appl. No. 14/226,121, filed Mar. 26, 2014, Wong et al.
U.S. Appl. No. 14/309,047, filed Jun. 19, 2014, Zavala Jurado et al.
U.S. Appl. No. 14/617,068, filed Feb. 9, 2015, Whitney et al.
U.S. Appl. No. 14/675,828, filed Apr. 1, 2015, Long et al.
U.S. Appl. No. 14/675,860, filed Apr. 1, 2015, Long et al.
U.S. Appl. No. 14/931,134, filed Nov. 3, 2015, Wong et al.

* cited by examiner

AIRFLOW CONTROL SYSTEMS AND METHODS USING MODEL PREDICTIVE CONTROL

CROSS-REFERENCE TO RELATED APPLICATIONS

This application claims the benefit of U.S. Provisional Application No. 61/815,049, filed on Apr. 23, 2013. The disclosure of the above application is incorporated herein by reference in its entirety.

This application is related to U.S. patent application Ser. No. 13/911,132 filed on Jun. 6, 2013, Ser. No. 13/911,121 filed on Jun. 6, 2013 and Ser. No. 13/911,156 filed on Jun. 6, 2013. The entire disclosures of the above applications are incorporated herein by reference.

FIELD

The present disclosure relates to internal combustion engines and more particularly to engine control systems and methods for vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

In a feature, an engine control system for a vehicle is disclosed. A torque requesting module generates a first torque request for a spark ignition engine based on driver input. A torque conversion module converts the first torque request into a second torque request. A setpoint module generates air and exhaust setpoints for the spark ignition engine based on the second torque request. A model predictive control (MPC) module: identifies sets of possible target values based on the air and exhaust setpoints; generates predicted parameters based on a model of the spark ignition engine and the sets of possible target values, respectively; selects one of the sets of possible target values based on the predicted parameters; and sets target values based on the possible target values of the selected one of the sets. A first constraint module selectively sets a predetermined range for first one of the target values. The MPC module limits the first one of the target values to within the predetermined range. A throttle actuator module controls opening of a throttle valve based on a second one of the target values.

In further features, the first and second target values are different ones of the target values.

In still further features, the first constraint module sets the predetermined range in response to a determination that actuation of the throttle valve is impeded.

In yet further features, the first constraint module sets the predetermined range in response to a determination that actuation of a camshaft phaser is impeded.

In further features, the first constraint module sets the predetermined range in response to a determination that actuation of an exhaust gas recirculation (EGR) valve is impeded.

In still further features, a second constraint module selectively sets a second predetermined range for a first one of the air and exhaust setpoints. The setpoint module limits the first one of the setpoint values to within the second predetermined range.

In yet further features, the second constraint module sets the second predetermined range based on the predetermined range set for the first one of the target values.

In further features: a boost actuator module controls opening of a wastegate based on a third one of the target values; an exhaust gas recirculation (EGR) actuator module controls opening of an EGR valve based on a fourth one of the target values; and a phaser actuator module controls intake and exhaust valve phasing based on fifth and sixth ones of the target values.

In still further features, the first constraint module adjusts the predetermined range for the first one of the target values from a first boundary to a second boundary of a predetermined range of actuation of an associated engine actuator.

In yet further features, the first constraint module adjusts the predetermined range for the first one of the target values from a first boundary to a second boundary of a second predetermined range around the first one of the target values.

In a feature, an engine control method for a vehicle includes: generating a first torque request for a spark ignition engine based on driver input; converting the first torque request into a second torque request; and generating air and exhaust setpoints for the spark ignition engine based on the second torque request. The method further includes, using a model predictive control (MPC) module: identifying sets of possible target values based on the air and exhaust setpoints; generating predicted parameters based on a model of the spark ignition engine and the sets of possible target values, respectively; selecting one of the sets of possible target values based on the predicted parameters; and setting target values based on the possible target values of the selected one of the sets. The method further includes: selectively setting a predetermined range for first one of the target values; limiting the first one of the target values to within the predetermined range; and controlling opening of a throttle valve based on a second one of the target values.

In further features, the first and second target values are different ones of the target values.

In still further features, the method further includes setting the predetermined range in response to a determination that actuation of the throttle valve is impeded.

In yet further features, the method further includes setting the predetermined range in response to a determination that actuation of a camshaft phaser is impeded.

In further features, the method further includes setting the predetermined range in response to a determination that actuation of an exhaust gas recirculation (EGR) valve is impeded.

In still further features, the method further includes: selectively setting a second predetermined range for a first one of the air and exhaust setpoints; and limiting the first one of the setpoint values to within the second predetermined range.

In yet further features, the method further includes setting the second predetermined range based on the predetermined range set for the first one of the target values.

In further features, the method further includes: controlling opening of a wastegate based on a third one of the target values; controlling opening of an an exhaust gas recirculation (EGR) valve based on a fourth one of the target values; and controlling intake and exhaust valve phasing based on fifth and sixth ones of the target values.

In still further features, the method further includes adjusting the predetermined range for the first one of the target values from a first boundary to a second boundary of a predetermined range of actuation of an associated engine actuator.

In yet further features, the method further includes adjusting the predetermined range for the first one of the target values from a first boundary to a second boundary of a second predetermined range around the first one of the target values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control module (ECM) controls torque output of an engine. More specifically, the ECM controls actuators of the engine based on target values, respectively, to produce a requested amount of torque. For example, the ECM controls intake and exhaust camshaft phasing based on target intake and exhaust phaser angles, a throttle valve based on a target throttle opening, an exhaust gas recirculation (EGR) valve based on a target EGR opening, and a wastegate of a turbocharger based on a target wastegate duty cycle.

The ECM could determine the target values individually using multiple single input single output (SISO) controllers, such as proportional integral derivative (PID) controllers. However, when multiple SISO controllers are used, the target values may be set to maintain system stability at the expense of possible fuel consumption decreases. Additionally, calibration and design of the individual SISO controllers may be costly and time consuming.

The ECM of the present disclosure generates the target values using model predictive control (MPC). More specifically, the ECM generates various engine air and exhaust setpoints, such as an intake manifold pressure setpoint, an air per cylinder (APC) setpoint, external and residual dilution setpoints, and a compression ratio setpoint. In various implementations, intake and exhaust phasing setpoints may be generated and used in place of the external and residual dilution setpoints.

The ECM identifies possible sets of target values for achieving the setpoints. The ECM determines predicted parameters (responses) for each of the possible sets based on the possible sets' target values and a model of the engine. Constraints are also accounted for. The ECM determines a cost associated with use of each of the possible sets based on comparisons of the predicted parameters with the setpoints, respectively. For example, the ECM may determine the cost associated with a possible set based on how quickly the predicted parameters reach the setpoints and/or how far the predicted parameters overshoot the setpoints, respectively. The ECM may select the one of the possible sets having the lowest cost, and set the target values using the target values of the selected possible set.

Figure 1:
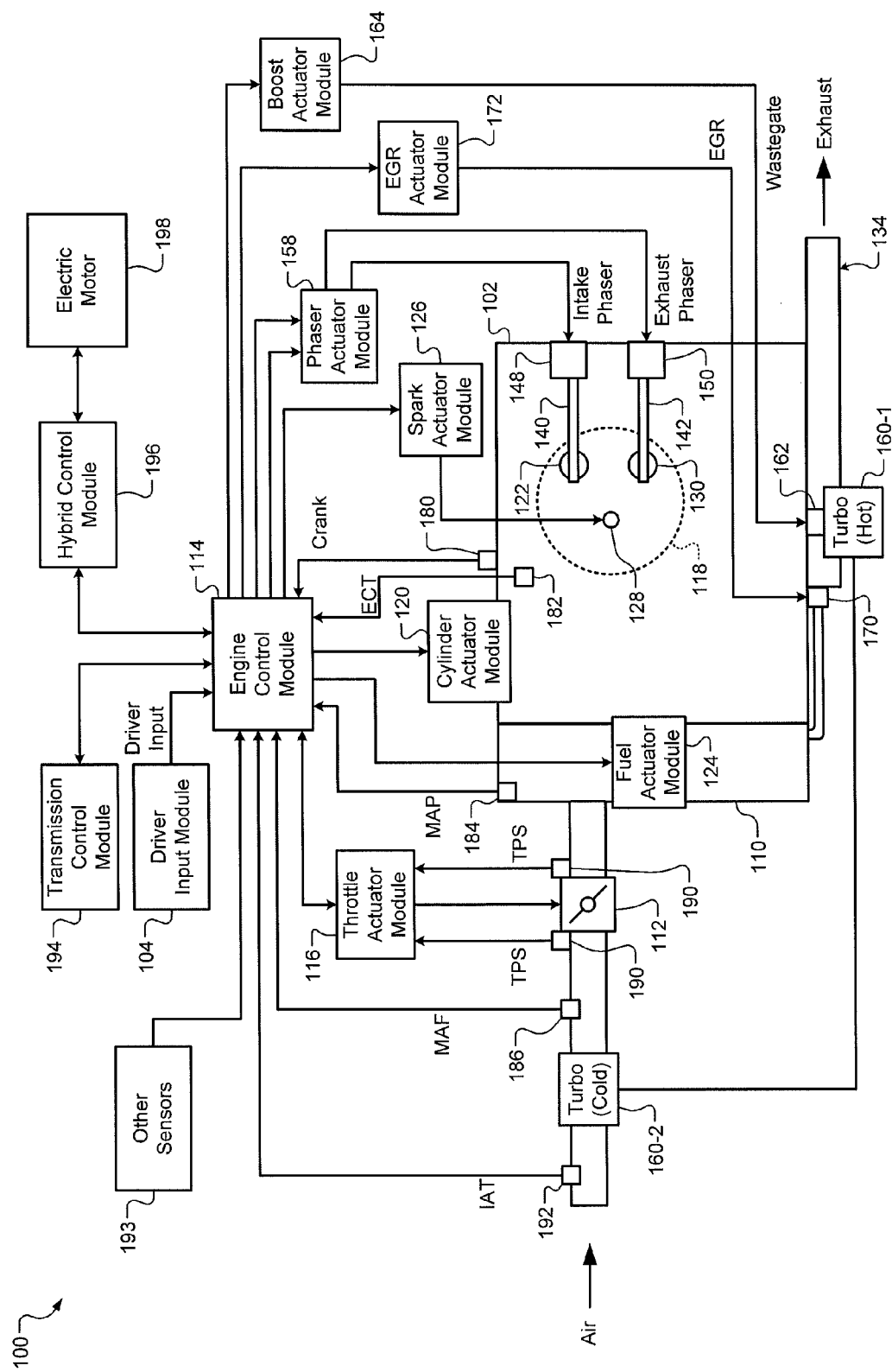
FIG. 1 is a functional block diagram of an example engine system according to the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
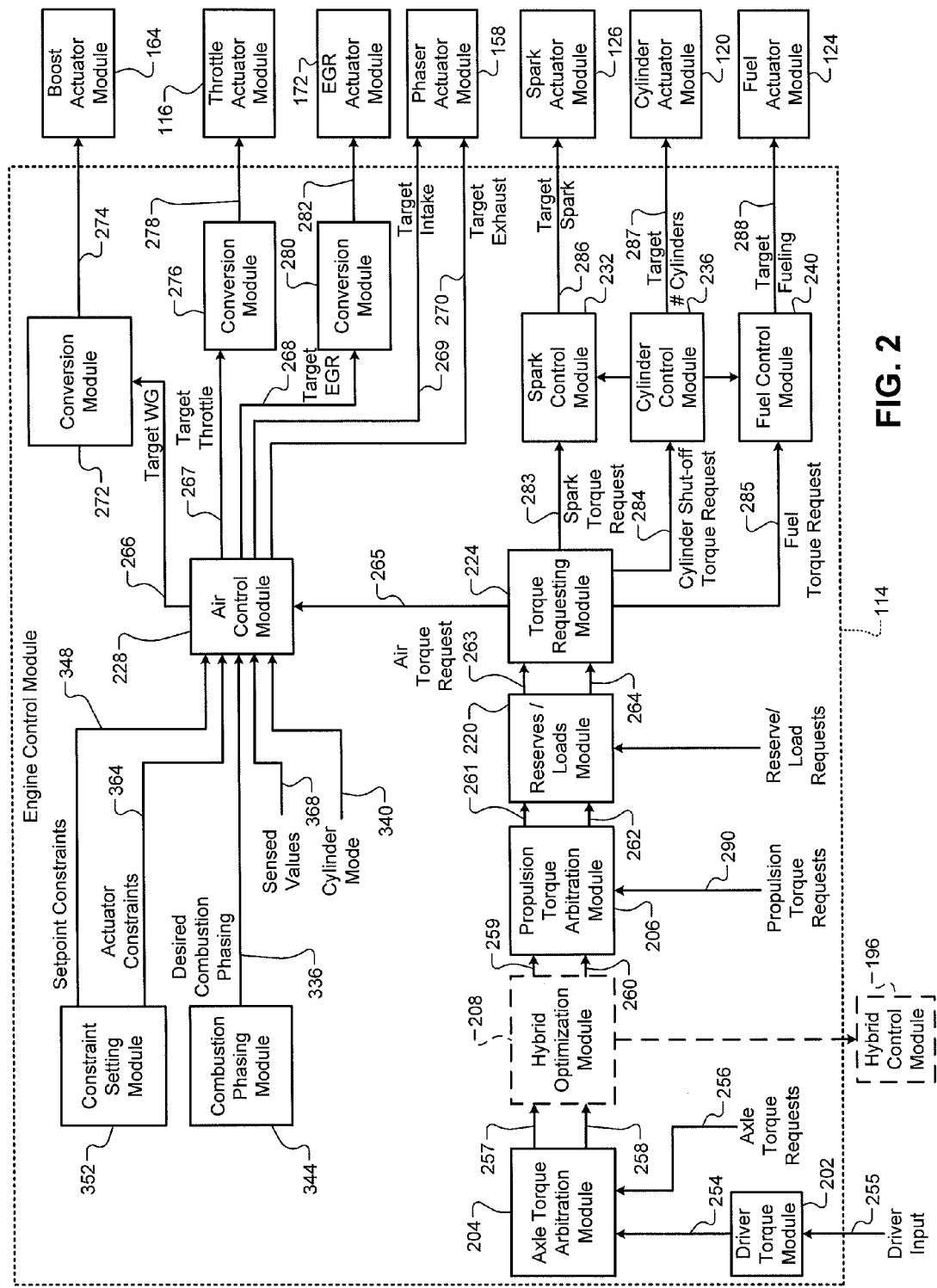
FIG. 2 is a functional block diagram of an example engine control system according to the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, a torque requesting module 224, an air control module 228, a spark control module 232, a cylinder control module 236, and a fuel control module 240.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. For example, the axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the engine actuators.

In general terms, the immediate torque request 258 may be an amount of currently desired axle torque, while the predicted torque request 257 may be an amount of axle torque that may be needed on short notice. The ECM 114 controls the engine system 100 to produce an axle torque equal to the immediate torque request 258. However, different combinations of target values may result in the same axle torque. The ECM 114 may therefore adjust the target values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. Fast engine actuators are defined in contrast with slow engine actuators.

In general terms, fast engine actuators can change the axle torque more quickly than slow engine actuators. Slow actuators may respond more slowly to changes in their respective target values than fast actuators do. For example, a slow actuator may include mechanical components that require time to move from one position to another in response to a change in target value. A slow actuator may also be characterized by the amount of time it takes for the axle torque to begin to change once the slow actuator begins to implement the changed target value. Generally, this amount of time will be longer for slow actuators than for fast actuators. In addition, even after beginning to change, the axle torque may take longer to fully respond to a change in a slow actuator.

For example only, the spark actuator module 126 may be a fast actuator. Spark-ignition engines may combust fuels including, for example, gasoline and ethanol, by applying a spark. By way of contrast, the throttle actuator module 116 may be a slow actuator.

For example, as described above, the spark actuator module 126 can vary the spark timing for a next firing event when the spark timing is changed between a last firing event and the next firing event. By way of contrast, changes in throttle opening take longer to affect engine output torque. The throttle actuator module 116 changes the throttle opening by adjusting the angle of the blade of the throttle valve 112. Therefore, when the target value for opening of the throttle valve 112 is changed, there is a mechanical delay as the throttle valve 112 moves from its previous position to a new position in response to the change. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum value, which allows the engine 102 to produce the full engine output torque achievable with the air flow already present. The engine output torque may therefore be quickly increased to the predicted torque request 257 without experiencing delays from changing the throttle opening.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

For example, the propulsion torque requests 290 may include torque reductions for engine over-speed protection, torque increases for stall prevention, and torque reductions requested by the transmission control module 194 to accommodate gear shifts. The propulsion torque requests 290 may also result from clutch fuel cutoff, which reduces the engine output torque when the driver depresses the clutch pedal in a manual transmission vehicle to prevent a flare (rapid rise) in engine speed.

The propulsion torque requests 290 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

For example only, a catalyst light-off process or a cold start emissions reduction process may require retarded spark timing. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The torque requesting module 224 receives the adjusted predicted and immediate torque requests 263 and 264. The torque requesting module 224 determines how the adjusted predicted and immediate torque requests 263 and 264 will be achieved. The torque requesting module 224 may be engine type specific. For example, the torque requesting module 224 may be implemented differently or use different control schemes for spark-ignition engines versus compression-ignition engines.

In various implementations, the torque requesting module 224 may define a boundary between modules that are common across all engine types and modules that are engine type specific. For example, engine types may include spark-ignition and compression-ignition. Modules prior to the torque requesting module 224, such as the propulsion torque arbitration module 206, may be common across engine types, while the torque requesting module 224 and subsequent modules may be engine type specific.

The torque requesting module 224 determines an air torque request 265 based on the adjusted predicted and immediate torque requests 263 and 264. The air torque request 265 may be a brake torque. Brake torque may refer to torque at the crankshaft under the current operating conditions.

Target values for airflow controlling engine actuators are determined based on the air torque request 265. More specifically, based on the air torque request 265, the air control module 228 determines a target wastegate opening area 266, a target throttle opening area 267, a target EGR opening area 268, a target intake cam phaser angle 269, and a target exhaust cam phaser angle 270. The air control module 228 determines the target wastegate opening area 266, the target throttle opening area 267, the target EGR opening area 268, the target intake cam phaser angle 269, and the target exhaust cam phaser angle 270 using model predictive control, as discussed further below.

The boost actuator module 164 controls the wastegate 162 to achieve the target wastegate opening area 266. For example, a first conversion module 272 may convert the target wastegate opening area 266 into a target duty cycle 274 to be applied to the wastegate 162, and the boost actuator module 164 may apply a signal to the wastegate 162 based on the target duty cycle 274. In various implementations, the first conversion module 272 may convert the target wastegate opening area 266 into a target wastegate position (not shown), and convert the target wastegate position into the target duty cycle 274.

The throttle actuator module 116 controls the throttle valve 112 to achieve the target throttle opening area 267. For example, a second conversion module 276 may convert the target throttle opening area 267 into a target duty cycle 278 to be applied to the throttle valve 112, and the throttle actuator module 116 may apply a signal to the throttle valve 112 based on the target duty cycle 278. In various implementations, the second conversion module 276 may convert the target throttle opening area 267 into a target throttle position (not shown), and convert the target throttle position into the target duty cycle 278.

The EGR actuator module 172 controls the EGR valve 170 to achieve the target EGR opening area 268. For example, a third conversion module 280 may convert the target EGR opening area 268 into a target duty cycle 282 to be applied to the EGR valve 170, and the EGR actuator module 172 may apply a signal to the EGR valve 170 based on the target duty cycle 282. In various implementations, the third conversion module 280 may convert the target EGR opening area 268 into a target EGR position (not shown), and convert the target EGR position into the target duty cycle 282.

The phaser actuator module 158 controls the intake cam phaser 148 to achieve the target intake cam phaser angle 269. The phaser actuator module 158 also controls the exhaust cam phaser 150 to achieve the target exhaust cam phaser angle 270. In various implementations, a fourth conversion module (not shown) may be included and may convert the target intake and exhaust cam phaser angles into target target intake and exhaust duty cycles, respectively. The phaser actuator module 158 may apply the target intake and exhaust duty cycles to the intake and exhaust cam phasers 148 and 150, respectively.

The torque requesting module 224 may also generate a spark torque request 283, a cylinder shut-off torque request 284, and a fuel torque request 285 based on the predicted and immediate torque requests 263 and 264. The spark control module 232 may determine how much to retard the spark timing (which reduces engine output torque) from an optimum spark timing based on the spark torque request 283. For example only, a torque relationship may be inverted to solve for a target spark timing 286. For a given torque request ($T_{Req}$), the target spark timing ($S_T$) 286 may be determined based on:

$$S_T = f^{-1}(T_{Req}, APC, I, E, AF, OT, \#). \quad (1)$$

This relationship may be embodied as an equation and/or as a lookup table. The air/fuel ratio (AF) may be the actual air/fuel ratio, as reported by the fuel control module 240.

When the spark timing is set to the optimum spark timing, the resulting torque may be as close to a maximum best torque (MBT) as possible. MBT refers to the maximum engine output torque that is generated for a given air flow as spark timing is advanced, while using fuel having an octane rating greater than a predetermined octane rating and using stoichiometric fueling. The spark timing at which this maximum torque occurs is referred to as an MBT spark timing. The optimum spark timing may differ slightly from MBT spark timing because of, for example, fuel quality (such as when lower octane fuel is used) and environmental factors, such as ambient humidity and temperature. The engine output torque at the optimum spark timing may therefore be less than MBT. For example only, a table of optimum spark timings corresponding to different engine operating conditions may be determined during a calibration phase of vehicle design, and the optimum value is determined from the table based on current engine operating conditions.

The cylinder shut-off torque request 284 may be used by the cylinder control module 236 to determine a target number of cylinders to deactivate 287. In various implementations, a target number of cylinders to activate may be used. The cylinder actuator module 120 selectively activates and deactivates the valves of cylinders based on the target number 287.

The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 285. More specifically, the fuel control module 240 may generate target fueling parameters 288 based on the fuel torque request 285. The target fueling parameters 288 may include, for example, target mass of fuel, target injection starting timing, and target number of fuel injections.

During normal operation, the fuel control module 240 may operate in an air lead mode in which the fuel control module 240 attempts to maintain a stoichiometric air/fuel ratio by controlling fueling based on air flow. For example, the fuel control module 240 may determine a target fuel mass that will yield stoichiometric combustion when combined with a present mass of air per cylinder (APC).

Figure 3A:
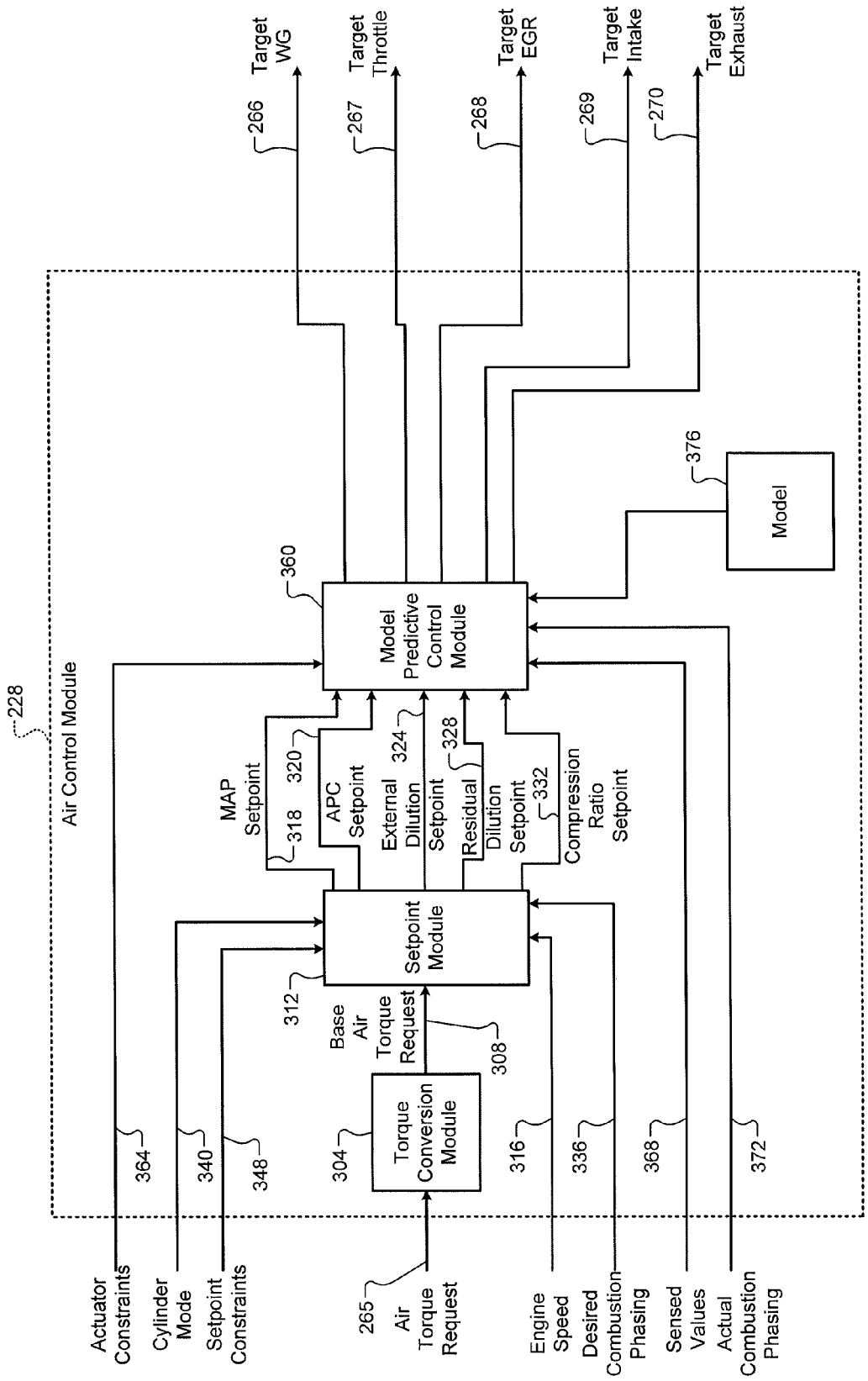
FIGS. 3A-3B are functional block diagrams of example air control modules according to the present disclosure.
Figure 3B:
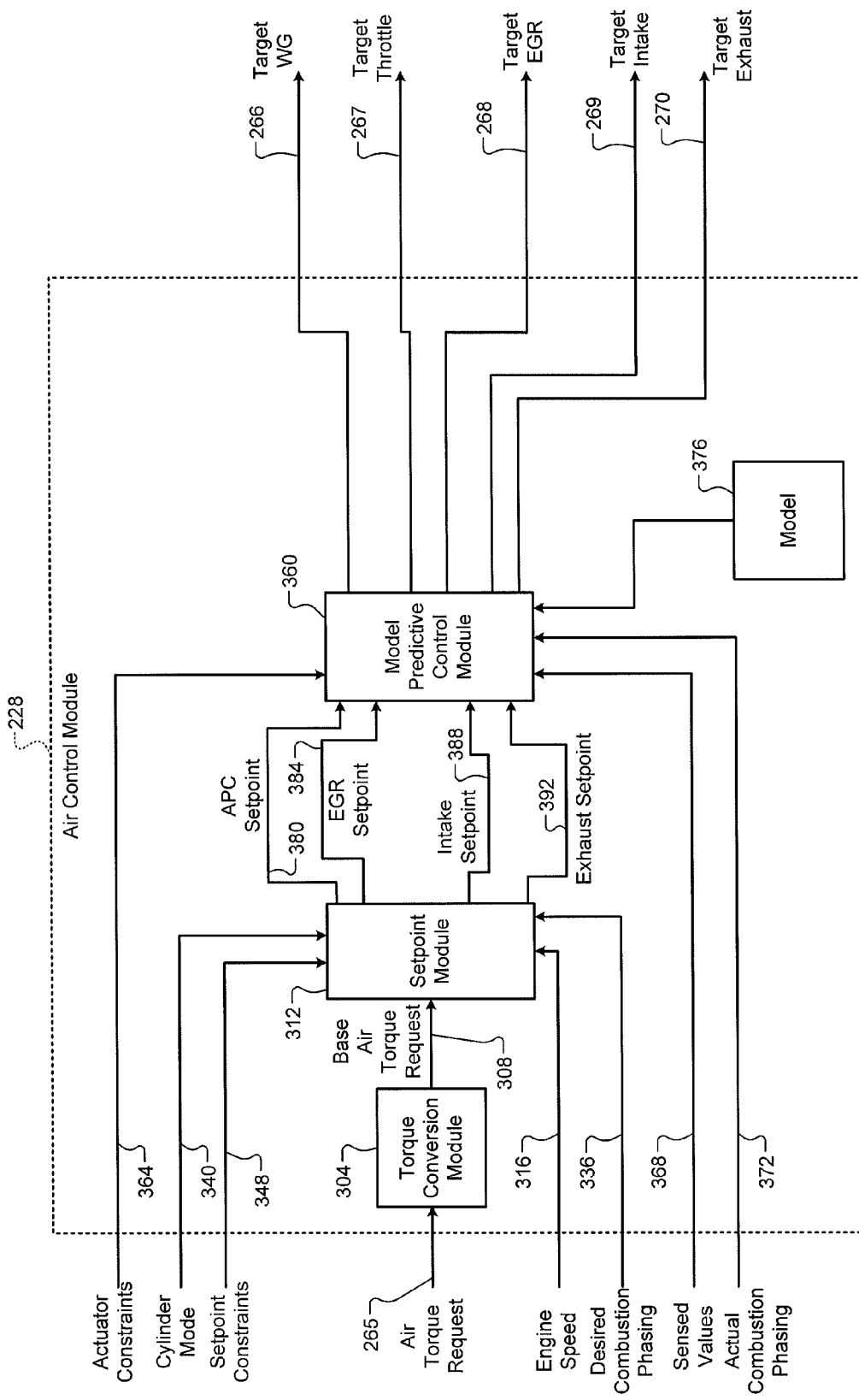

FIGS. 3A-3B are functional block diagrams of example implementations of the air control module 228. Referring now to FIGS. 2, 3A, and 3B, as discussed above, the air torque request 265 may be a brake torque. A torque conversion module 304 converts the air torque request 265 from brake torque into base torque. The torque request resulting from conversion into base torque will be referred to as a base air torque request 308.

Base torques may refer to torque at the crankshaft made during operation of the engine 102 on a dynamometer while the engine 102 is warm and no torque loads are imposed on the engine 102 by accessories, such as an alternator and the A/C compressor. The torque conversion module 304 may convert the air torque request 265 into the base air torque request 308, for example, using a mapping or a function that relates brake torques to base torques.

In various implementations, the torque conversion module 304 may convert the air torque request 265 into another type of torque that is suitable for use by a setpoint module 312, such as an indicated torque. An indicated torque may refer to a torque at the crankshaft attributable to work produced via combustion within the cylinders.

The setpoint module 312 generates setpoint values for controlling the throttle valve 112, the EGR valve 170, the wastegate 162, the intake cam phaser 148, and the exhaust cam phaser 150 to achieve the base air torque request 308 at a present engine speed 316. The setpoints may be referred to as engine air and exhaust setpoints. The engine speed 316 may be determined, for example, based on a crankshaft position measured using the crankshaft position sensor 180.

For example, as in FIG. 3A, the setpoint module 312 may generate a manifold pressure (e.g., a MAP) setpoint 318, a mass of air per cylinder (APC) setpoint 320, an external dilution setpoint 324, a residual dilution setpoint 328, and an effective compression ratio setpoint 332. The setpoint module 312 may generate the manifold pressure setpoint 318, the APC setpoint 320, the external dilution setpoint 324, the residual dilution setpoint 328, and the effective compression ratio setpoint 332 using one or more functions or mappings that relate the base air torque request 308 and the engine speed 316 to the setpoints 318-332. The setpoint module 312 may also generate one or more other setpoints based on the base air torque request 308 and the engine speed 316.

The manifold pressure setpoint 318 may refer to a target pressure within the intake manifold 110. The APC setpoint 320 may refer to a target mass of air to be drawn into a cylinder for a combustion event. An effective compression ratio may also be referred to as a dynamic compression ratio.

Dilution may refer to an amount of exhaust from a prior combustion event trapped within a cylinder for a combustion event. External dilution may refer to exhaust provided for a combustion event via the EGR valve 170. Internal dilution may refer to exhaust that remains in a cylinder and/or exhaust that is pushed back into the cylinder following the exhaust stroke of a combustion cycle. The external dilution setpoint 324 may refer to a target amount of external dilution. The internal dilution setpoint 328 may refer to a target amount of internal dilution.

As in FIG. 3B, the setpoint module 312 may generate a mass of air per cylinder (APC) setpoint 380, an EGR setpoint 384, an intake cam phasing setpoint 388, and an exhaust cam phasing setpoint 392. The setpoint module 312 may generate the APC setpoint 380, the EGR setpoint 384, the intake cam phasing setpoint 388, and the exhaust cam phasing setpoint 392 using one or more functions or mappings that relate the base air torque request 308 and the engine speed 316 to the setpoints 380-392. The setpoint module 312 may also generate one or more other setpoints based on the base air torque request 308 and the engine speed 316.

The APC setpoint 380 may refer to a target mass of air to be drawn into a cylinder for a combustion event. The EGR setpoint 384 may refer to, for example, a target mass fraction of EGR to be drawn into the cylinder for the combustion event or an EGR mass flow rate back to the intake manifold 110. A mass fraction of EGR may refer to a ratio of a mass fraction of EGR to the (total) mass of a gas charge of a combustion event. The intake and exhaust cam phasing setpoints 388 and 392 may refer to target positions (phasing) of the intake and exhaust cam phasers 18 and 150, respectively.

Referring now to FIGS. 2, 3A, and 3B, while the following description will be made with reference to the setpoints 318-332, the setponts 380-392 may be used.

The setpoint module 312 may generate one or more of the setpoints 318-332 further based on desired combustion phasing 336 and a cylinder mode 340. The cylinder mode 340 may refer to, for example, the number of cylinders that are deactivated (or activated) and/or a mode of operation of the engine 102 where one or more cylinders (e.g., half or another fraction) are deactivated.

When one or more cylinders are deactivated, each cylinder that is activated is responsible for producing a greater amount of torque in order to achieve the base air torque request 308. The setpoint module 312 may therefore adjust one or more of the setpoints 318-332 based on the cylinder mode 340. For example, the setpoint module 312 may increase the APC setpoint 320 based on the cylinder mode 340. The setpoint module 312 may additionally or alternatively adjust one or more of the other setpoints 318-332 based on the cylinder mode 340.

Combustion phasing may refer to a crankshaft position where a predetermined amount of injected fuel is combusted within a cylinder relative to a predetermined crankshaft position for combustion of the predetermined amount of injected fuel. For example, combustion phasing may be expressed in terms of CA50 relative to a predetermined CA50. CA50 may refer to a crankshaft position (or angle, hence CA) where 50 percent of a mass of injected fuel has been combusted within a cylinder. The predetermined CA50 may correspond to a CA50 where a maximum amount of work is produced from the fuel injected and may be approximately 8.5-approximately 10 degrees after TDC.

A combustion phasing module 344 (FIG. 2) may generally set the desired combustion phasing 336 such that the CA50 occurs at the predetermined CA50. In other words, the combustion phasing module 344 may generally set the desired combustion phasing 336 such that zero combustion phasing occurs to achieve the maximum work and therefore a maximum fuel efficiency. However, the combustion phasing module 344 may selectively adjust the desired combustion phasing 336 under some circumstances.

For example, the combustion phasing module 344 may set the desired combustion phasing such that the CA50 occurs after the predetermined CA50 when knock is detected. Knock may be detected, for example, using one or more knock sensors. Additionally or alternatively, the combustion phasing module 344 may set the desired combustion phasing such that the CA50 occurs after the predetermined CA50 when one or more conditions are present that may cause knock to occur. For example, knock may occur when a quality of fuel within a fuel tank of the vehicle is less than a predetermined quality and/or the ambient temperature is greater than a predetermined temperature and ambient humidity is less than a predetermined value.

When combustion is retarded such that the CA50 occurs after the predetermined CA50, airflow into the cylinders should be increased to achieve the base air torque request 308. The setpoint module 312 may therefore adjust one or more of the setpoints 318-332 based on the desired combustion phasing 336. For example, the setpoint module 312 may increase the APC setpoint 320 when the desired combustion phasing 336 is retarded to provide a CA50 that is after the predetermined CA50.

The setpoint module 312 also generates the setpoints 318-332 based on one or more setpoint constraints 348. A constraint setting module 352 may set the setpoint constraints 348 for the setpoints 318-332 to predetermined acceptable ranges, respectively. The setpoint module 312 sets the setpoints 318-332 to remain within the setpoint constraints 348, respectively.

However, the constraint setting module 352 may selectively adjust a setpoint constraint under some circumstances. For example only, the constraint setting module 352 may set a setpoint constraint to disable dilution. The setpoint module 312 may limit the external dilution setpoint 324 and the residual dilution setpoint 328 to zero in response the setpoint constraint to disable dilution.

The setpoint module 312 may also adjust one or more of the other setpoints based on the limitation of a setpoint. For example, the setpoint module 312 may increase the APC setpoint 320 in order to achieve the base air torque request 308 when the external and residual dilution setpoints 324 and 328 are limited.

A model predictive control (MPC) module 360 generates the target values 266-270, subject to actuator constraints 364, based on the setpoints 318-332, sensed values 368, actual combustion phasing 372, and a model 376 of the engine 102, using MPC. MPC involves the MPC module 360 identifying possible sequences of the target values 266-270 that could be used together during N future control loops, subject to the actuator constraints 364, and given the sensed values 368 and the actual combustion phasing 372, to achieve the setpoints 318-332.

Each possible sequence includes one sequence of N values for each of the target values 266-270. In other words, each possible sequence includes a sequence of N values for the target wastegate opening area 266, a sequence of N values for the target throttle opening area 267, a sequence of N values for the target EGR opening area 268, a sequence of N values for the target intake cam phaser angle 269, and a sequence of N values for the target exhaust cam phaser angle 270. Each of the N values are for a corresponding one of the N control loops.

The MPC module 360 determines predicted responses of the engine 102 to the identified possible sequences of the target values 266-270, respectively, using the model 376 of the engine 102. The MPC module 360 generates a prediction for parameters corresponding to the setpoints 318-332 based on a given possible sequence of the target values 266-270. More specifically, based on a given possible sequence of the target values 266-270, using the model 376, the MPC module 360 generates a sequence of predicted manifold pressures for the N control loops, a sequence of predicted APCs for the N control loops, a sequence of predicted amounts of external dilution for the N control loops, a sequence of predicted amounts of residual dilution for the N control loops, and a sequence of predicted compression ratios for the N control loops. The model 376 may be, for example, a function or a mapping calibrated based on characteristics of the engine 102.

The MPC module 360 determines a cost for each of the possible sequences of the target values 266-270 based on relationships between the setpoints 318-332 and the predictions, respectively. For example, the MPC module 360 may determine the cost for each of the possible sequences of the target values 266-270 based on the periods for the predicted parameters to reach the setpoints 318-332, respectively, and/or amounts that the predicted parameters overshoot the setpoints 318-332, respectively. For example only, the cost may increase as the period for a predicted parameter to reach a setpoint increases and/or as the amount that the predicted parameter overshoots the setpoint increases.

Each pair of predicted parameters and setpoints may be weighted to affect how much the relationships between the predicted parameters and the setpoints affects the cost. For example, the relationship between the predicted APC and the APC setpoint 320 maybe weighted to affect the cost more than the relationship between another predicted parameter and the corresponding setpoint. The relationship between the predicted APC and the APC setpoint 320 may be weighted to affect the cost more because APC is most closely related to engine torque production. Weighting the relationship between the predicted APC and the APC setpoint 320 to affect the cost more may therefore enable satisfaction of changes in the base air torque request 308.

The MPC module 360 selects one of the possible sequences of the target values 266-270 based on the costs of the possible sequences of the target values 266-270. For example, the MPC module 360 may select the one of the possible sequences having the lowest cost.

The MPC module 360 may then set the target values 266-270 to the first ones of the N values of the selected possible sequence, respectively. In other words, the MPC module 360 may set the target wastegate opening area 266 to the first one of the N values in the sequence of N values for the target wastegate opening area 266, set the target throttle opening area 267 to the first one of the N values in the sequence of N values for the target throttle opening area 267, set the target EGR opening area 268 to the first one of the N values in the sequence of N values for the target EGR opening area 268, set the target intake cam phaser angle 269 to the first one of the N values in the sequence of N values for the target intake cam phaser angle 269, and set the target exhaust cam phaser angle 270 to the first one of the N values in the sequence of N values for the target exhaust cam phaser angle 270. During a next control loop, the MPC module 360 identifies possible sequences, generates the predicted responses of the possible sequences, determines the cost of each of the possible sequences, selects of one of the possible sequences, and sets of the target values 266-270 to the first set of the target values 266-270 in the selected possible sequence.

The constraint setting module 352 may set the actuator constraints 364. Generally, the constraint setting module 352 may set the actuator constraints 364 for the throttle valve 112, the EGR valve 170, the wastegate 162, the intake cam phaser 148, and the exhaust cam phaser 150 to predetermined acceptable ranges, respectively. The MPC module 360 identifies the possible sequences such that the target values 266-270 remain within the actuator constraints 364, respectively.

However, the constraint setting module 352 may selectively adjust an actuator constraint under some circumstances. For example, the constraint setting module 352 may adjust the actuator constraint for a given engine actuator to narrow the range of possible targets for that engine actuator when a fault is diagnosed in that engine actuator. For another example only, the constraint setting module 352 may adjust the actuator constraint such that the target value for a given actuator follows a predetermined schedule for a fault diagnostic, such as a cam phaser fault diagnostic or an EGR diagnostic. The boundaries of a range can be set to the same value to cause a target value to be set to that value, and the value used can be varied over time to cause the target value to follow the predetermined schedule.

The sensed values 368 may be measured using sensors or determined based on one or more values measured using one or more sensors. The actual combustion phasing 372 may be determined, for example, based on the actual CA50 during a previous predetermined period relative to the predetermined CA50. Retardation of the CA50 relative to the predetermined CA50 during the predetermined period may indicate that extra energy has been input to the exhaust system 134. The MPC module 360 may therefore increase the target wastegate opening area 266 to offset the extra energy in the exhaust system 134. Otherwise, the extra energy may cause boost of the turbocharger to increase.

Figure 4:
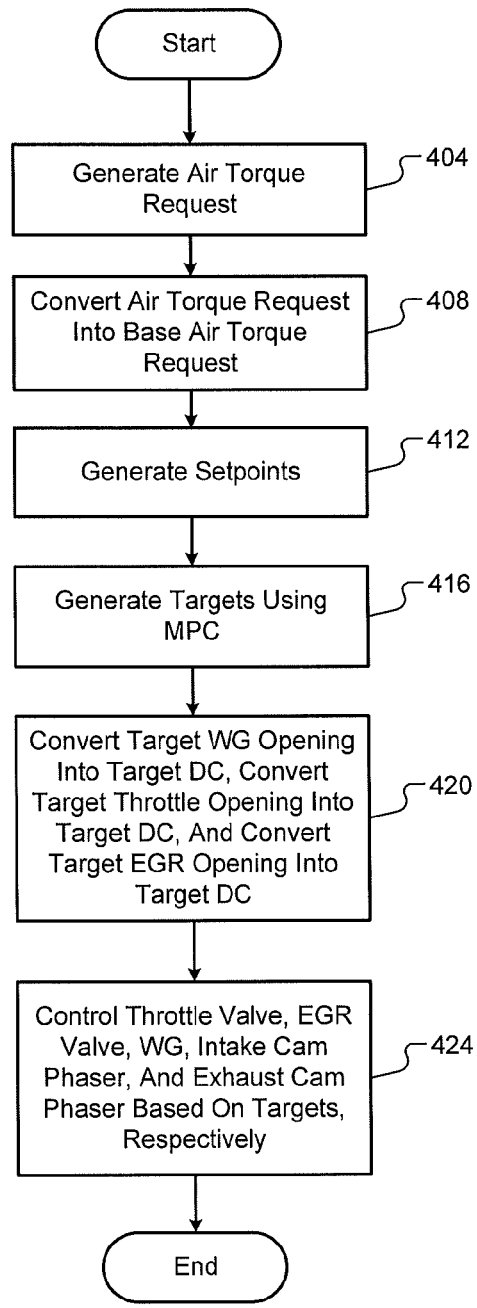
FIG. 4 includes a flowchart depicting an example method of controlling a throttle valve, intake and exhaust valve phasing, a wastegate, and an exhaust gas recirculation (EGR) valve using model predictive control according to the present disclosure.

Referring now to FIG. 4, a flowchart depicting an example method of controlling the throttle valve 112, the intake cam phaser 148, the exhaust cam phaser 150, the wastegate 162, and the EGR valve 170 using MPC (model predictive control) is presented. Control may begin with 404 where the torque requesting module 224 determines the air torque request 265 based on the adjusted predicted and immediate torque requests 263 and 264.

At 408, the torque conversion module 304 may convert the air torque request 265 into the base air torque request 308 or into another type of torque suitable for use by the setpoint module 312. At 412, the setpoint module 312 generates the setpoints 318-332 based on the base air torque request 308 and the engine speed 316, subject to the setpoint constraints 348. The setpoint module 312 may generate the setpoints 318-332 further based on the cylinder mode 340 and/or the desired combustion phasing 336.

At 416, the MPC module 360 generates the target values 266-270 based on the setpoints 318-332, subject to the actuator constraints 364, using MPC. More specifically, as described above, the MPC module 360 identifies possible sequences of the target values 266-270 and generates predicted responses using the model 376. The MPC module 360 also determines costs for the possible sequences based on the predicted responses, selects one of the possible sequences based on the costs, and sets the target values 266-270 based on the first ones of the target values in the selected possible sequence, respectively.

At 420, the first conversion module 272 converts the target wastegate opening area 266 into the target duty cycle 274 to be applied to the wastegate 162, the second conversion module 276 converts the target throttle opening area 267 into the target duty cycle 278 to be applied to the throttle valve 112. The third conversion module 280 also converts the target EGR opening area 268 into the target duty cycle 282 to be applied to the EGR valve 170 at 420. The fourth conversion module may also convert the target intake and exhaust cam phaser angles 269 and 270 into the target intake and exhaust duty cycles to be applied to the intake and exhaust cam phasers 148 and 150, respectively.

At 424, the throttle actuator module 116 controls the throttle valve 112 to achieve the target throttle opening area 267, and the phaser actuator module 158 controls the intake and exhaust cam phasers 148 and 150 to achieve the target intake and exhaust cam phaser angles 269 and 270, respectively. For example, the throttle actuator module 116 may apply a signal to the throttle valve 112 at the target duty cycle 278 to achieve the target throttle opening area 267. Also at 424, the EGR actuator module 172 controls the EGR valve 170 to achieve the target EGR opening area 268, and the boost actuator module 164 controls the wastegate 162 to achieve the target wastegate opening area 266. For example, the EGR actuator module 172 may apply a signal to the EGR valve 170 at the target duty cycle 282 to achieve the target EGR opening area 268, and the boost actuator module 164 may apply a signal to the wastegate 162 at the target duty cycle 274 to achieve the target wastegate opening area 266. While FIG. 4 is shown as ending after 424, FIG. 4 may be illustrative of one control loop, and control loops may be executed at a predetermined rate.

Figure 5:
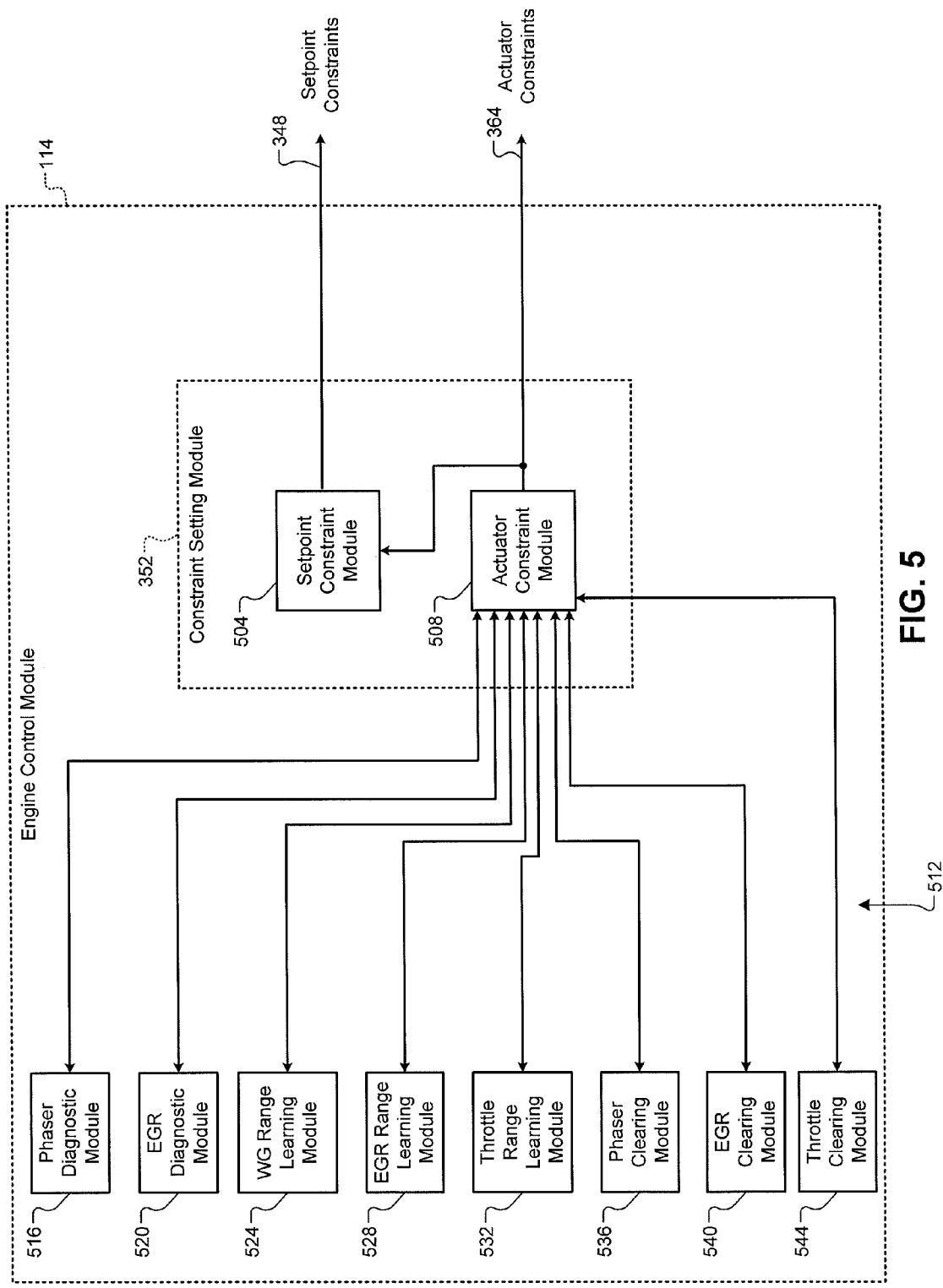
FIG. 5 is a functional block diagram of an example constraint setting system according to the present disclosure.

Referring now to FIG. 5, a functional block diagram of a constraint setting system is presented. The target values 266-270 are generally determined as discussed above. However, under some circumstances, one or more of the target values 266-270 may need to be controlled in a predetermined way for one or more reasons. The constraint setting module 352 may set the associated one or more of the actuator constraints 364 such that the one or more of the target values 266-270 are controlled in that way.

For example, one or more of the target values 266-270 may be controlled in a predetermined way in an effort to clear an obstruction from the associated engine actuator. Additionally or alternatively, one or more of the target values 266-270 may be controlled in a predetermined way to determine a range of actuation of the associated engine actuator. Additionally or alternatively, one or more of the target values 266-270 may be controlled in a predetermined way to determine whether a fault is present in an engine actuator.

The constraint setting module 352 may include a setpoint constraint module 504 and an actuator constraint module 508. The actuator constraint module 508 receives various requests 512 to set the target values 266-270 in predetermined ways.

For example, a phaser diagnostic module 516 may generate a request for the actuator constraint 364 (associated with the target intake cam phaser angle 269) to be set to adjust the target intake cam phaser angle 269 from a first predetermined boundary of an expected range of operation of the intake cam phaser 148 to a second predetermined boundary of the expected range of operation of the intake cam phaser 148. The phaser diagnostic module 516 may generate the request to diagnose whether a fault is present in the intake cam phaser 148 based on a response of the intake cam phaser 148 to the request. For example, the phaser diagnostic module 516 may determine whether a fault is present in the intake cam phaser 148 based on whether the intake cam phaser 148 is able to move from the first predetermined boundary to the second predetermined boundary.

The phaser diagnostic module 516 may generate this request, for example, when fuel is cutoff to the engine 102. If a fault is diagnosed in the intake cam phaser 148, the phaser diagnostic module 516 may notify the actuator constraint module 508 of the fault. When the fault is present, the actuator constraint module 508 may set the associated one of the actuator constraints 364 to limit the target intake cam phaser angle 269 to a predetermined value or to within a predetermined range.

Additionally or alternatively, the phaser diagnostic module 516 may generate a request for the actuator constraint 364 (associated with the target exhaust cam phaser angle 270) to be set to adjust the target exhaust cam phaser angle 270 from a third predetermined boundary of an expected range of operation of the exhaust cam phaser 150 to a fourth predetermined boundary of the expected range of operation of the exhaust cam phaser 150. The phaser diagnostic module 516 may generate the request to diagnose whether a fault is present in the exhaust cam phaser 150 based on a response of the exhaust cam phaser 150 to the request. For example, the phaser diagnostic module 516 may determine whether a fault is present in the exhaust cam phaser 150 based on whether the exhaust cam phaser 150 is able to move from the third predetermined boundary to the fourth predetermined boundary.

The phaser diagnostic module 516 may generate this request, for example, when fuel is cutoff to the engine 102. If a fault is diagnosed in the exhaust cam phaser 150, the phaser diagnostic module 516 may notify the actuator constraint module 508 of the fault. When the fault is present, the actuator constraint module 508 may set the associated one of the actuator constraints 364 to limit the target exhaust cam phaser value 270 to a predetermined value or to within a predetermined range.

An EGR diagnostic module 520 may generate a request for the actuator constraint 364 (associated with the target EGR opening area 268) to be set to adjust the target EGR opening area 268 to open and close the EGR valve 170. The EGR diagnostic module 520 may also generate the request for the actuator constraints 364 for the target throttle opening area 267, the target intake and exhaust cam phaser angles 269 and 270, and the target wastegate opening area 266 be maintained constant during the opening and closing of the EGR valve 170. Maintaining the target throttle opening area 267, the target intake and exhaust cam phaser angles 269 and 270, and the target wastegate opening area 266 while the EGR valve 170 is opened and closed may help to ensure that pressure changes across the EGR valve 170 are attributable to opening and closing of the EGR valve 170.

The EGR diagnostic module 520 may generate the request to diagnose whether a fault is present in the EGR valve 170. The EGR diagnostic module 520 may determine whether a fault is present in the EGR valve 170 based on whether the pressure across the EGR valve 170 changes in response to opening and closing of the EGR valve 170.

The EGR diagnostic module 520 may generate this request, for example, when fuel is cutoff to the engine 102. If a fault is diagnosed in the EGR valve 170, the EGR diagnostic module 520 may notify the actuator constraint module 508 of the fault. When the fault is present, the actuator constraint module 508 may set the associated one of the actuator constraints 364 to limit the target EGR opening area 268 to a predetermined value or to within a predetermined range.

A wastegate range learning module 524 may generate a request for the actuator constraint 364 (associated with the target wastegate opening area 266) to be set to adjust the target wastegate opening area 266 from one boundary of an expected range of operation of the wastegate 162 to the other boundary of the expected range of operation of the wastegate 162. The wastegate range learning module 524 may learn a range of operation of the wastegate 162 based movement of the wastegate 162 in response to the request.

The wastegate range learning module 524 may notify the actuator constraint module 508 of the learned range of operation of the wastegate 162. The actuator constraint module 508 may set the associated one of the actuator constraints 364 to limit the target wastegate opening area 266 to within the learned range of operation of the wastegate 162 when a fault is not present in the wastegate 162.

An EGR range learning module 528 may generate a request for the actuator constraint 364 (associated with the target EGR opening area 268) to be set to adjust the target EGR opening area 268 from one boundary of an expected range of operation of the EGR valve 170 to the other boundary of the expected range of operation of the EGR valve 170. The EGR range learning module 528 may learn a range of operation of the EGR valve 170 based movement of the EGR valve 170 in response to the request.

The EGR range learning module 528 may notify the actuator constraint module 508 of the learned range of operation of the EGR valve 170. The actuator constraint module 508 may set the associated one of the actuator constraints 364 to limit the target EGR opening area 268 to within the learned range of operation of the EGR valve 170 when a fault is not present in the EGR valve 170.

A throttle range learning module 532 may generate a request for the actuator constraint 364 (associated with the target throttle opening area 267) to be set to adjust the target throttle opening area 267 from one boundary of an expected range of operation of the throttle valve 112 to the other boundary of the expected range of operation of the throttle valve 112. The throttle range learning module 532 may learn a range of operation of the throttle valve 112 based movement of the throttle valve 112 in response to the request.

The throttle range learning module 532 may notify the actuator constraint module 508 of the learned range of operation of the throttle valve 112. The actuator constraint module 508 may set the associated one of the actuator constraints 364 to limit the target throttle opening area 267 to within the learned range of operation of the throttle valve 112 when a fault is not present in the throttle valve 112.

Range learning may also be requested and performed for the intake cam phaser 148 and/or the exhaust cam phaser 150. The actuator constraint module 508 may limit the associated actuator constraints 364 to limit the target intake and exhaust cam phaser angles 269 and 270 to within the learned ranges of operation of the intake and exhaust cam phasers 148 and 150.

A phaser clearing module 536 may generate a request for the actuator constraint 364 (associated with the target intake cam phaser angle 269) to be set to adjust the target intake cam phaser angle 269 from a first predetermined angle to a second predetermined angle. The phaser clearing module

536 may generate the request, for example, when the phaser clearing module 536 determines that more force or power was required to adjust the intake cam phaser 148 to the target intake cam phaser angle 269 than expected.

More force or power may be required, for example, when debris is impeding motion of the intake cam phaser 148. Adjustment of the target intake cam phaser angle 269 from the first predetermined angle to the second predetermined angle may be performed in an effort to clear the debris and allow the intake cam phaser 148 to actuate freely. The first and second predetermined angles may be set, for example, to the first and second boundaries of the expected operating range of the intake cam phaser 148 or to values that define a predetermined range around the target intake cam phaser angle 269 where the phaser clearing module 536 determined that greater than expected force or power was required.

The phaser clearing module 536 may additionally or alternatively generate a request for the actuator constraint 364 (associated with the target exhaust cam phaser angle 270) to be set to adjust the target exhaust cam phaser angle 270 from a third predetermined angle to a fourth predetermined angle. The phaser clearing module 536 may generate the request, for example, when the phaser clearing module 536 determines that more force or power was required to adjust the exhaust cam phaser 150 to the target exhaust cam phaser angle 270 than expected.

More force or power may be required, for example, when debris is impeding motion of the exhaust cam phaser 150. Adjustment of the target exhaust cam phaser angle 270 from the third predetermined angle to the fourth predetermined angle may be performed in an effort to clear the debris and allow the exhaust cam phaser 150 to actuate freely. The third and fourth predetermined angles may be set, for example, to the third and fourth boundaries of the expected operating range of the exhaust cam phaser 150 or to values that define a predetermined range around the target exhaust cam phaser angle 270 where the phaser clearing module 536 determined that greater than expected force or power was required.

An EGR clearing module 540 may generate a request for the actuator constraint 364 (associated with the target EGR opening area 268) to be set to adjust the target EGR opening area 268 from a first predetermined opening to a second predetermined opening. The EGR clearing module 540 may generate the request, for example, when the EGR clearing module 540 determines that more force or power was required to adjust the EGR valve 170 to the target EGR opening area 268 than expected.

More force or power may be required, for example, when debris is impeding motion of the EGR valve 170. Adjustment of the target EGR opening area 268 from the first predetermined opening to the second predetermined opening may be performed in an effort to clear the debris and allow the EGR valve 170 to actuate freely. The first and second predetermined openings may be set, for example, to predetermined boundaries of an expected operating range of the EGR valve 170 or to values that define a predetermined range around the target EGR opening area 268 where the EGR clearing module 540 determined that greater than expected force or power was required.

A throttle clearing module 544 may generate a request for the actuator constraint 364 (associated with the target throttle opening area 267) to be set to adjust the target throttle opening area 267 from a third predetermined opening to a fourth predetermined opening. The throttle clearing module 544 may generate the request, for example, when the throttle clearing module 544 determines that more force or power was required to adjust the throttle valve 112 to the target throttle opening area 267 than expected.

More force or power may be required, for example, when debris (e.g., ice) is impeding motion of the throttle valve 112. Adjustment of the target throttle opening area 267 from the third predetermined opening to the fourth predetermined opening may be performed in an effort to clear the debris and allow the throttle valve 112 to actuate freely. The third and fourth predetermined openings may be set, for example, to predetermined boundaries of an expected operating range of the throttle valve 112 or to values that define a predetermined range around the target throttle opening area 267 where the throttle clearing module 544 determined that greater than expected force or power was required.

While not shown, a wastegate clearing module may generate a request for the actuator constraint 364 (associated with the target wastegate opening area 266) to be set to adjust the target wastegate opening area 266 from a fifth predetermined opening to a sixth predetermined opening. The wastegate clearing module may generate the request, for example, when the wastegate clearing module determines that more force or power was required to adjust the wastegate 162 to the target wastegate opening area 266 than expected.

More force or power may be required, for example, when debris is impeding motion of the wastegate 162. Adjustment of the target wastegate opening area 266 from the fifth predetermined opening to the sixth predetermined opening may be performed in an effort to clear the debris and allow the wastegate 162 to actuate freely. The fifth and sixth predetermined openings may be set, for example, to predetermined boundaries of an expected operating range of the wastegate 162 or to values that define a predetermined range around the target wastegate opening area 266 where the wastegate clearing module determined that greater than expected force or power was required.

The actuator constraint module 508 arbitrates received requests for setting one or more of the target values 266-270. For example, the actuator constraint module 508 may select one request as a winning request based on predetermined arbitration rules. The actuator constraint module 508 may set one or more of the actuator constraints 364 based on the winning request. The actuator constraint module 508 may set others of the actuator constraints 364 that are not affected by the winning request to within their respective operating ranges.

Under some circumstances, the actuator constraint module 508 may determine that no received requests should be honored. In such a case, none of the actuator constraints 364 are set based on a received request.

The actuator constraint module 508 notifies requestors whose requests are not honored, including requestors whose requests are not honored pursuant to arbitration and requestors whose requests are not honored for one or more other reasons. The actuator constraint module 508 may notify each requestor of whether or not its request was honored. A requestor whose request is honored can perform the function for which the request was generated when the request is honored.

The setpoint constraint module 504 also receives the actuator constraints 364. The setpoint constraint module 504 generally sets the setpoint constraints 348 to predetermined ranges for the setpoint constraints 348, respectively. The setpoint constraint module 504 may selectively adjust one or more of the setpoint constraints 348 under some circumstances.

For example, the setpoint constraint module 504 may adjust one or more of the setpoint constraints 348 based on one or more of the actuator constraints 364. For example, when the target throttle opening area 267 is limited based on its actuator constraint 364, the setpoint constraint module 504 may set the associated one of the setpoint constraints 348 to limit the manifold pressure setpoint 318 based on the limitation of the target throttle opening area 267. For another example only, when the target intake cam phaser angle 269 is limited to a predetermined angle (e.g., parked) based on its actuator constraint 364 due to a fault the intake cam phaser 148, the setpoint constraint module 504 may set one or more of the setpoints constraints 348 such that the MPC module 360 will set the target intake cam phaser angle 269 to the predetermined angle. The setpoint constraint module 504 adjusting one or more of the setpoint constraints 348 based on one or more of the actuator constraints 364 may cause the setpoint module 312 to set the setpoints 318-332 to values that are achievable by the MPC module 360.

Figure 6:
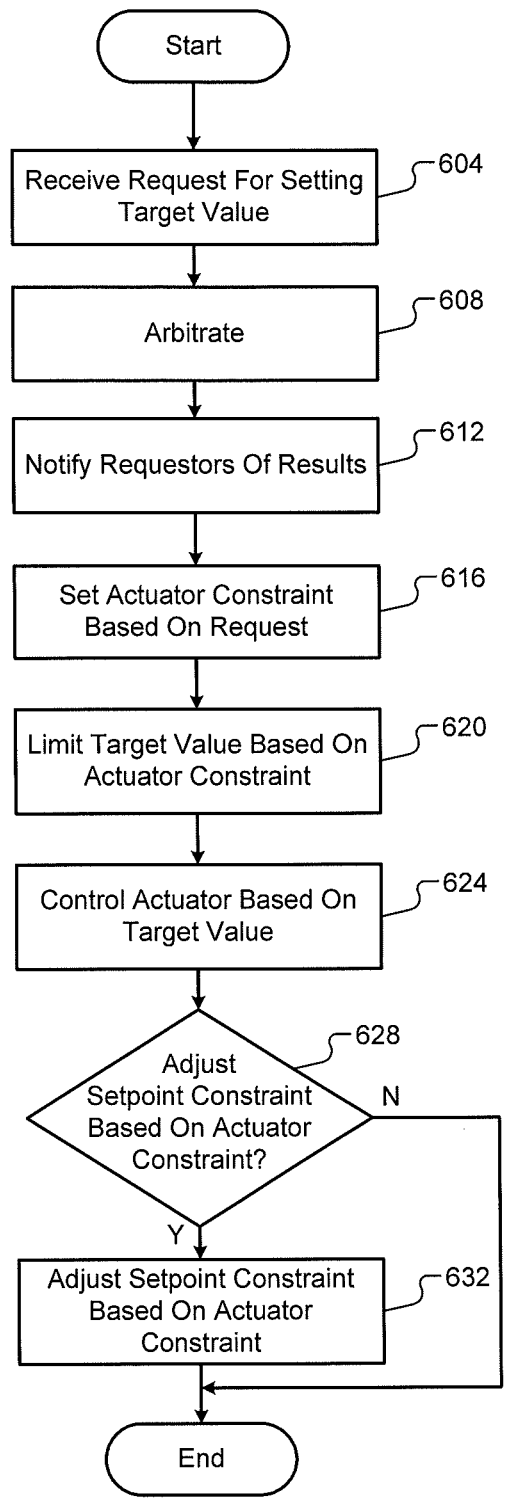
FIG. 6 is a flowchart depicting an example method of setting an actuator constraint and controlling an engine actuator based on the constraint according to the present disclosure.

Referring now to FIG. 6, a flowchart depicting an example method of setting one of the actuator constraints 364 and controlling the associated engine actuator based on that actuator constraint 364 is presented. At 604, the actuator constraint module 508 receives a request to set one of the target values 266-270 in a predetermined way. While the following will be discussed in terms of a request to set one of the target values 266-270, the request may also specify how to set one or more of the other target values 266-270. One or more other requests may also be received at 604.

At 608, the actuator constraint module 508 performs arbitration on the received request to determine whether to honor the received request. At 612, the actuator constraint module 508 notifies requestors whose requests were not honored. The actuator constraint module 508 may also notify the requestor whose request was honored so the function for which the request was generated can be performed.

At 616, the actuator constraint module 508 sets the associated one of the actuator constraints 364 based on the received request. For example, the actuator constraint module 508 may set the predetermined range of the associated one of the actuator constraints 364 to one value at 616 such that the associated one of the target values 266-270 will be set to that one value. The actuator constraint module 508 may selectively adjust the predetermined range over time to control the one of the actuator constraints 364 in the predetermined way. While FIG. 6 is described in terms of the request received in 604 winning the arbitration and being honored, no requests may be honored under some circumstances.

The MPC module 360 limits the one of the target values 266-270 that is associated with the one of the actuator constraints 364 based on the one of the actuator constraints 364 at 620. For example, the MPC module 360 may set the one of the target values 266-270 to the one of the actuator constraints 364. The target values 266-270 may be converted, for example, into target duty cycles to be applied to the corresponding engine actuators. At 624, the associated actuator module controls the associated engine actuator based on the one of the target values 266-270. In this manner, the associated engine actuator is controlled as requested, for example, to determine whether a fault is present in the engine actuator, to learn a range of operation of the engine actuator, or to clear debris from the engine actuator.

At 628, the setpoint constraint module 504 may determine whether one or more of the setpoint constraints 348 can be adjusted based on the actuator constraint 364. If 628 is true, the setpoint constraint module 504 may selectively adjust one or more of the setpoint constraints 348 based on the actuator constraint 364 at 632, and control may end. If 628 is false, the setpoint constraint module 504 may refrain from adjusting the setpoint constraints 348 and control may end. While FIG. 6 is shown and discussed as ending, FIG. 6 may be illustrative of one control loop, and control loops may be executed at a predetermined rate.

Figure 7:
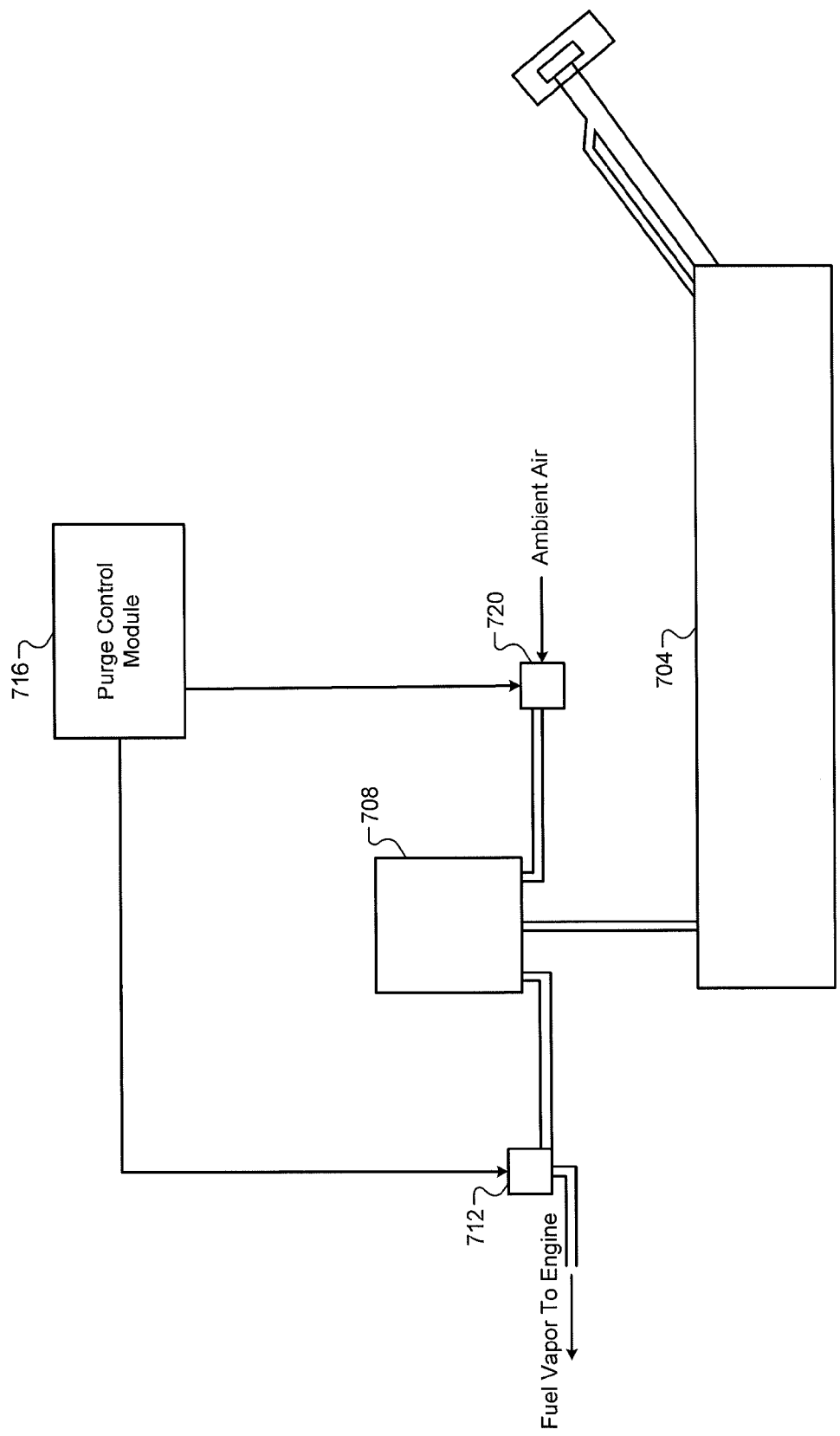
FIG. 7 is a functional block diagram of an example fuel system according to the present disclosure.

Referring now to FIG. 7, a functional block diagram of an example fuel system is presented. A fuel system supplies liquid fuel and fuel vapor to the engine 102. The fuel system includes a fuel tank 704 that contains liquid fuel. Liquid fuel is drawn from the fuel tank 704 and supplied to the fuel injectors by one or more fuel pumps (not shown).

Some conditions, such as heat, vibration, and/or radiation, may cause liquid fuel within the fuel tank 704 to vaporize. A vapor canister 708 traps and stores vaporized fuel (fuel vapor). The vapor canister 708 may include one or more substances that trap and store fuel vapor, such as one or more types of charcoal.

Operation of the engine 102 may create a vacuum within the intake manifold 110. A purge valve 712 may be selectively opened to draw fuel vapor from the vapor canister 708 to the intake manifold 110. A purge control module 716 may control the purge valve 712 to control the flow of fuel vapor to the engine 102. The purge control module 716 also controls a switching (vent) valve 720.

When the switching valve 720 is in a vent (open) position, the purge control module 716 may selectively open the purge valve 712 to purge fuel vapor from the vapor canister 708 to the intake manifold 110. The intake manifold 110 draws fuel vapor from the vapor canister 708 through the purge valve 712 to the intake manifold 110. Ambient air is drawn into the vapor canister 708 through the switching valve 720 as fuel vapor is drawn from the vapor canister 708. In various implementations, the purge control module 716 may be implemented within the ECM 114.

Figure 8:
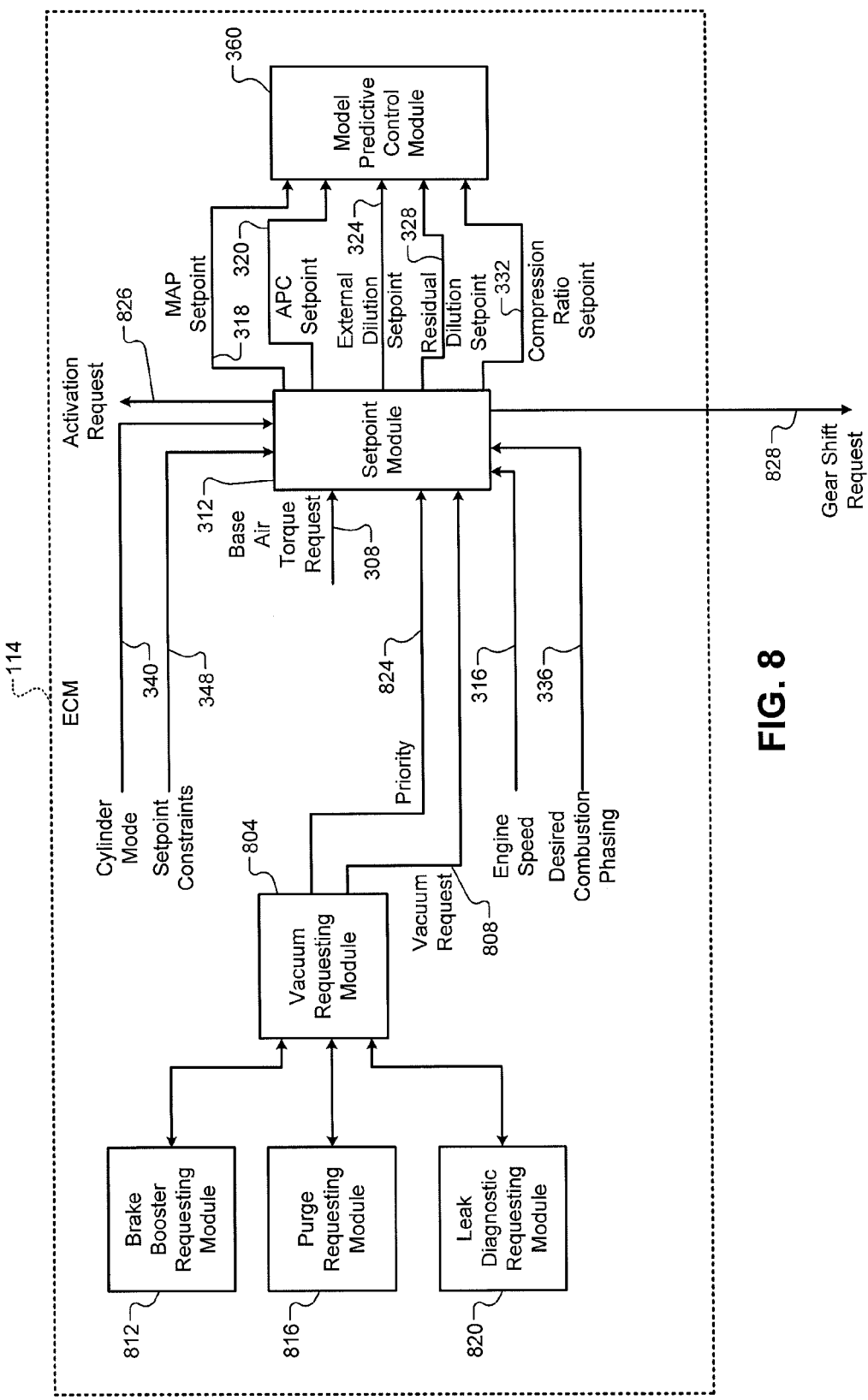
FIG. 8 is a functional block diagram of an example vacuum and setpoint control system according to the present disclosure.

Referring now to FIG. 8, a functional block diagram of an example vacuum and setpoint control system is presented. As discussed above, the setpoint module 312 generate the setpoints 318-332 based on the base air torque request 308, the engine speed 316, the desired combustion phasing 336, and the cylinder mode 340, subject to the setpoint constraints 348.

The setpoint module 312 may selectively adjust one or more of the setpoints 318-332 under one or more circumstances, such as to create vacuum (relative to ambient air pressure) within the intake manifold 110. The setpoint module 312 may selectively adjust one or more of the setponts to create vacuum within the intake manifold 110, for example, to increase vacuum within a brake booster (not shown), to purge fuel vapor from the vapor canister 708, and/or to diagnose a leak in the fuel system (FIG. 7), such as in the purge valve 712 and/or the switching valve 720.

A vacuum requesting module 804 selectively generates a vacuum request 808 to create vacuum within the intake manifold 110. The vacuum request 808 may include an amount of vacuum relative to ambient air pressure. The vacuum requesting module 804 may generate the vacuum request 808 and set the amount of vacuum based on a requestor of the intake manifold vacuum and one or more other parameters.

A driver actuates a brake pedal to apply brakes of the vehicle to slow the vehicle. A brake booster helps the driver apply the brakes of the vehicle using vacuum drawn from the intake manifold. The brake booster draws vacuum from the intake manifold when vacuum within the intake manifold is greater than vacuum within the brake booster.

Vacuum may be created within the intake manifold 110, for example, by closing the throttle valve 112. However, some engines are controlled to minimize throttling, for example, to minimize pumping losses and increase fuel efficiency. Accordingly, the vacuum within the intake manifold 110 may be low, zero, or even negative (i.e., intake manifold pressure greater than ambient pressure) under some circumstances.

A brake booster requesting module 812 selectively requests creation of vacuum within the intake manifold 110 in response to driver actuation of a brake pedal. Driver actuation of the brake pedal causes vacuum within the brake booster to decrease. The brake booster requesting module 812 may generate the request, for example, when vacuum within the brake booster is less than a predetermined vacuum. The vacuum within the brake booster may be measured, for example, using a sensor or determined for example, based on driver actuation of the brake pedal. When the brake booster requesting module 812 requests creation of vacuum within the intake manifold 110 to increase the vacuum within the brake booster, the vacuum requesting module 804 may set the vacuum request 808 to a first predetermined vacuum.

A purge requesting module 816 selectively requests creation of vacuum within the intake manifold 110 when an amount of fuel vapor within the vapor canister 708 is greater than a predetermined amount. As discussed above, vacuum draws fuel vapor from the vapor canister 708 to the intake manifold 110. The vacuum requesting module 804 may set the vacuum request 808 to a second predetermined vacuum when the purge requesting module 816 requests creation of vacuum within the intake manifold 110 to purge fuel vapor from the vapor canister 708.

A leak diagnostic requesting module 820 selectively requests creation of vacuum within the intake manifold 110 for performance of one or more fault diagnostics. More specifically, the leak diagnostic requesting module 820 determines whether one or more leaks are present in the fuel system (FIG. 7) based on vacuum within the intake manifold 110. The vacuum requesting module 804 may set the vacuum request 808 to a third predetermined vacuum when the leak diagnostic requesting module 820 requests creation of vacuum within the intake manifold 110 for the fault diagnostic(s).

The vacuum requesting module 804 notifies requestors of intake manifold vacuum when the vacuum requesting module 804 is generating the vacuum request 808 honoring a request for intake manifold vacuum. The requestor can then perform the function associated with the request, if any.

The setpoint module 312 selectively adjusts one or more of the setpoints 318-332 based on the vacuum request 808 to create vacuum within the intake manifold 110. For example, the setpoint module 312 may decrease the external dilution setpoint 324, decrease the residual dilution setpoint 328, and/or increase the effective compression ratio setpoint 332 based on the vacuum request 808.

While FIG. 8 is discussed in terms of the setpoints 318-332, FIG. 8 is also applicable to the setpoints 380-392 (FIG. 3B). For example, based on the vacuum request 808, the setpoint module 312 may decrease the EGR setpoint 384 and/or adjust the intake and/or exhaust cam phasing setpoints 388 and 392 to maximize volumetric efficiency, reduce internal dilution, and/or increase effective compression ratio.

The vacuum requesting module 804 may also generate a priority signal 824 that indicates a priority of the vacuum request 808. The setpoint module 312 may adjust one or more of the setpoints or determine when to adjust one or more of the setponts based on the priority signal 824. For example, when the priority signal 824 is set to a first state, indicating a high priority, the setpoint module 312 may adjust one or more of the setpoints more quickly and/or sooner at the cost of decreased fuel efficiency. The setpoint module 312 may adjust one or more of the setponts more slowly and/or later when the priority signal 824 is set to other states to indicate a lower priority.

The vacuum requesting module 804 may set the priority signal 824 based on the requestor of intake manifold vacuum and/or one or more other parameters. For example, the vacuum requesting module 804 may set the priority signal 824 to the high priority when the brake booster requesting module 812 is requesting intake manifold vacuum for the brake booster. The vacuum requesting module 804 may also set the priority signal 824 to the high priority when an amount of fuel vapor within the vapor canister 708 is greater than a first predetermined amount. The first predetermined amount may be, for example, approximately 80 percent of a maximum amount that the vapor canister 708 can store or another suitable amount.

The vacuum requesting module 804 may set the priority signal 824 to a second state, indicating a lower priority, when the amount of fuel vapor within the vapor canister 708 is less than a second predetermined amount. The second predetermined amount is less than the first predetermined amount and may be, for example, approximately 60 percent of the maximum amount or another suitable amount. The vacuum requesting module 804 may set the priority signal 824 to a lower priority when the leak diagnostic requesting module 820 is requesting intake manifold vacuum.

When the priority signal 824 is set to the first state (indicating high priority), the setpoint module 312 may determine whether the vacuum request 808 can be satisfied under the current cylinder activation/deactivation and gear conditions. If not, the setpoint module 312 may request that one or more changes be made so the vacuum request 808 can be satisfied.

For example, the setpoint module 312 may determine whether an amount of torque necessary to create the amount of vacuum requested is greater than a maximum amount of torque that the engine 102 can produce with the present number of cylinders activated. If the amount of torque necessary to create the requested amount of intake manifold vacuum is greater than the maximum amount of torque that the engine 102 can produce with the present number of cylinders activated, the setpoint module 312 may generate a request 826 that one or more deactivated cylinders be activated so the vacuum request 808 can be achieved. For example, the setpoint module 312 may request the cylinder control module 236 to decrease the target number of deactivated cylinders and increase the target number of activated cylinders. One or more deactivated cylinders may be activated based on the request 826.

The setpoint module 312 may additionally or alternatively determine whether an amount of torque necessary to create a requested amount of intake manifold vacuum could be created if the transmission was shifted to a lower gear than a present gear (to decrease the engine torque necessary to achieve a current axle torque request). If so, the setpoint module 312 may generate a request 828 to shift the transmission to the lower gear. The transmission control module 194 may selectively perform a gear shift to the lower gear so the vacuum request 808 can be satisfied.

Figure 9:
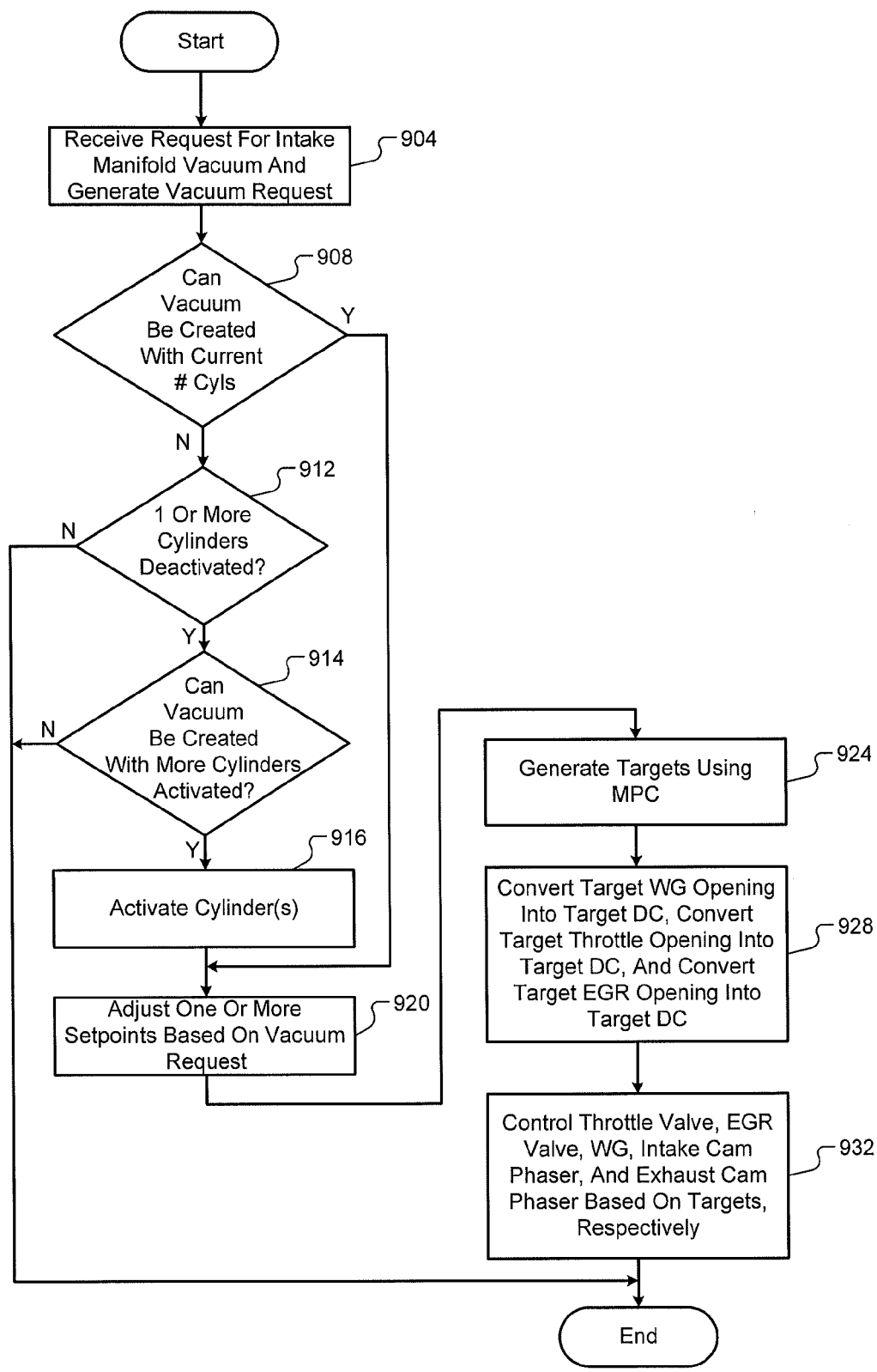
FIGS. 9-10 are flowcharts of example methods of selectively adjusting one or more of setpoints input to a model predictive controller according to the present disclosure.

Referring now to FIG. 9, a flowchart depicting an example method of selectively adjusting one or more of the setpoints input to the MPC module 360 is presented. At 7904, the vacuum requesting module 804 receives a request to create vacuum within the intake manifold 110. For example, the brake booster requesting module 812 may generate the request for increasing vacuum within the brake booster, the purge requesting module 816 may generate the request to purge fuel vapor from the vapor canister 708, or the leak diagnostic requesting module 820 may generate the request for performing the fault diagnostic(s). The vacuum requesting module 804 may generate the vacuum request 808 at 904 and notify the requestor accordingly.

At 908, the setpoint module 312 may determine whether the vacuum request 808 can be satisfied with the current number of activated cylinders. If 908 is true, control may transfer to 920, which is discussed further below. If 908 is false, control may continue with 912.

The setpoint module 312 may determine whether one or more cylinders are deactivated at 912. If 912 is false, control may end. If 912 is true, the setpoint module 312 may determine whether the vacuum request 808 can be satisfied with a greater number of cylinders activated at 914. If 914 is true, the setpoint module 312 may request that one or more cylinders be activated to so the vacuum request 808 can be satisfied at 916, and control may continue with 920. If 914 is false, control may end.

At 920, the setpoint module 312 may selectively adjust one or more of the setponts 318-332 or the setpoint 380-392 based on the vacuum request 808. For example, the setpoint module 312 may decrease the external dilution setpoint 324, decrease the residual dilution setpoint 328, and/or increase the effective compression ratio setpoint 332 based on the vacuum request 808. Using the setponts 380-392, the setpoint module 312 may decrease the EGR setpoint 384 and/or adjust the intake and/or exhaust cam phasing setpoints 388 and 392 to maximize volumetric efficiency, reduce internal dilution, and/or increase effective compression ratio.

At 924, the MPC module 360 generates the target values 266-270 based on the setpoints, subject to the actuator constraints 364, using MPC. More specifically, as described above, the MPC module 360 identifies possible sequences of the target values 266-270 and generates predicted responses using the model 376. The MPC module 360 also determines costs for the possible sequences based on the predicted responses, selects one of the possible sequences based on the costs, and sets the target values 266-270 based on the first ones of the target values in the selected possible sequence, respectively.

At 928, the first conversion module 272 converts the target wastegate opening area 266 into the target duty cycle 274 to be applied to the wastegate 162, the second conversion module 276 converts the target throttle opening area 267 into the target duty cycle 278 to be applied to the throttle valve 112. The third conversion module 280 also converts the target EGR opening area 268 into the target duty cycle 282 to be applied to the EGR valve 170 at 420. The fourth conversion module may also convert the target intake and exhaust cam phaser angles 269 and 270 into the target intake and exhaust duty cycles to be applied to the intake and exhaust cam phasers 148 and 150, respectively.

At 932, the throttle actuator module 116 controls the throttle valve 112 to achieve the target throttle opening area 267, and the phaser actuator module 158 controls the intake and exhaust cam phasers 148 and 150 to achieve the target intake and exhaust cam phaser angles 269 and 270, respectively. For example, the throttle actuator module 116 may apply a signal to the throttle valve 112 at the target duty cycle 278 to achieve the target throttle opening area 267. Also at 424, the EGR actuator module 172 controls the EGR valve 170 to achieve the target EGR opening area 268, and the boost actuator module 164 controls the wastegate 162 to achieve the target wastegate opening area 266. For example, the EGR actuator module 172 may apply a signal to the EGR valve 170 at the target duty cycle 282 to achieve the target EGR opening area 268, and the boost actuator module 164 may apply a signal to the wastegate 162 at the target duty cycle 274 to achieve the target wastegate opening area 266. While FIG. 9 is shown and described as ending, FIG. 9 may be illustrative of one control loop, and control loops may be executed at a predetermined rate.

Figure 10:
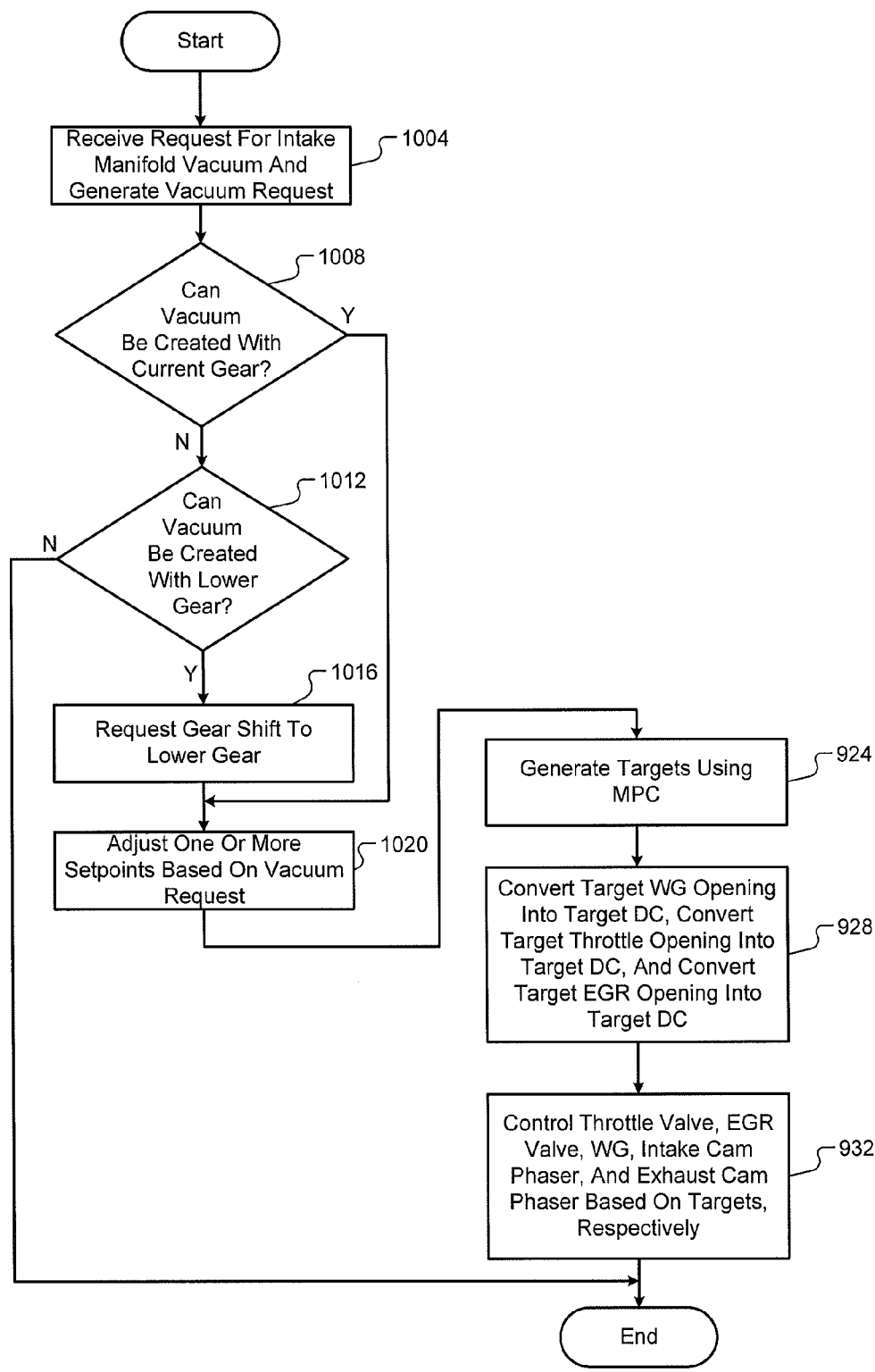

Referring now to FIG. 10, a flowchart depicting another example method of selectively adjusting one or more of the setpoints input to the MPC module 360 is presented. At 1004, the vacuum requesting module 804 receives a request to create vacuum within the intake manifold 110. For example, the brake booster requesting module 812 may generate the request for increasing vacuum within the brake booster, the purge requesting module 816 may generate the request to purge fuel vapor from the vapor canister 708, or the leak diagnostic requesting module 820 may generate the request for performing the fault diagnostic(s). The vacuum requesting module 804 may generate the vacuum request 808 at 1004 and notify the requestor accordingly.

At 1008, the setpoint module 312 may determine whether the vacuum request 808 can be satisfied with the transmission in the current gear. If 1008 is true, control may transfer to 1020, which is discussed further below. If 1008 is false, control may continue with 1012.

The setpoint module 312 may determine whether the vacuum request 808 can be satisfied if the transmission is shifted to a lower gear at 1012. If 1012 is false, control may end. If 1012 is true, control may continue with 1016. At 1016, the setpoint module 312 may request that the transmission control module shift the transmission to the lower gear at 1016.

At 1020, the setpoint module 312 may selectively adjust one or more of the setponts 318-332 or the setpoint 380-392 based on the vacuum request 808. For example, the setpoint module 312 may decrease the external dilution setpoint 324, decrease the residual dilution setpoint 328, and/or increase the effective compression ratio setpoint 332 based on the vacuum request 808. Using the setponts 380-392, the setpoint module 312 may decrease the EGR setpoint 384 and/or adjust the intake and/or exhaust cam phasing setpoints 388 and 392 to maximize volumetric efficiency, reduce internal dilution, and/or increase effective compression ratio. Control may then continue with 924-932, as discussed above. While FIG. 10 is shown and described as ending, FIG. 10 may be illustrative of one control loop, and control loops may be executed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An engine control system for a vehicle, comprising:
    a torque requesting module that generates a first torque request for a spark ignition engine based on driver input;
    a torque conversion module that converts the first torque request into a second torque request;
    a setpoint module that generates air and exhaust setpoints for the spark ignition engine based on the second torque request;
    a model predictive control (MPC) module that (i) identifies sets of possible target values based on the air and exhaust setpoints, that (ii) generates predicted parameters for the sets of possible target values, respectively, based on (a) a model of the spark ignition engine and (b) the sets of possible target values, respectively, that (iii) selects one of the sets of possible target values based on comparisons of the predicted parameters with the air and exhaust set points, and that (iv) sets target values based on the possible target values of the selected one of the sets;
    a first constraint module that selectively sets a predetermined range for a first one of the target values, wherein the MPC module limits the first one of the target values to within the predetermined range; and
    a throttle actuator module that controls opening of a throttle valve based on a second one of the target values.

2. The engine control system of claim 1 wherein the first and second target values are each a different one of the target values.

3. The engine control system of claim 1 wherein the first constraint module sets the predetermined range in response to a determination that actuation of the throttle valve is impeded.

4. The engine control system of claim 1 wherein the first constraint module sets the predetermined range in response to a determination that actuation of a camshaft phaser is impeded.

5. The engine control system of claim 1 wherein the first constraint module sets the predetermined range in response to a determination that actuation of an exhaust gas recirculation (EGR) valve is impeded.

6. The engine control system of claim 1 further comprising a second constraint module that selectively sets a second predetermined range for a first one of the air and exhaust setpoints, and
    wherein the setpoint module limits the first one of the air and exhaust setpoints to within the second predetermined range.

7. The engine control system of claim 6 wherein the second constraint module sets the second predetermined range based on the predetermined range set for the first one of the target values.

8. The engine control system of claim 1 further comprising:
    a boost actuator module that controls opening of a wastegate based on a third one of the target values;
    an exhaust gas recirculation (EGR) actuator module that controls opening of an EGR valve based on a fourth one of the target values; and
    a phaser actuator module that controls intake and exhaust valve phasing based on fifth and sixth ones of the target values.

9. The engine control system of claim 1 wherein the first constraint module adjusts the predetermined range for the first one of the target values from a first boundary to a second boundary of a predetermined range of actuation of an associated engine actuator.

10. The engine control system of claim 1 wherein the first constraint module adjusts the predetermined range for the first one of the target values from a first boundary to a second boundary of a second predetermined range around the first one of the target values.

11. An engine control method for a vehicle, comprising:
    generating a first torque request for a spark ignition engine based on driver input;
    converting the first torque request into a second torque request;
    generating air and exhaust setpoints for the spark ignition engine based on the second torque request;
    using a model predictive control (MPC) module:
        identifying sets of possible target values based on the air and exhaust setpoints;
        generating predicted parameters for the sets of possible target values, respectively, based on (a) a model of the spark ignition engine and (b) the sets of possible target values, respectively;

selecting one of the sets of possible target values based on comparisons of the predicted parameters with the air and exhaust set points; and setting target values based on the possible target values of the selected one of the sets;

selectively setting a predetermined range for a first one of the target values;

limiting the first one of the target values to within the predetermined range; and controlling opening of a throttle valve based on a second one of the target values.

12. The engine control method of claim 11 wherein the first and second target values are each a different one of the target values.

13. The engine control method of claim 11 further comprising setting the predetermined range in response to a determination that actuation of the throttle valve is impeded.

14. The engine control method of claim 11 further comprising setting the predetermined range in response to a determination that actuation of a camshaft phaser is impeded.

15. The engine control method of claim 11 further comprising setting the predetermined range in response to a determination that actuation of an exhaust gas recirculation (EGR) valve is impeded.

16. The engine control method of claim 11 further comprising:

selectively setting a second predetermined range for a first one of the air and exhaust setpoints; and limiting the first one of the air and exhaust setpoints to within the second predetermined range.

17. The engine control method of claim 16 further comprising setting the second predetermined range based on the predetermined range set for the first one of the target values.

18. The engine control method of claim 11 further comprising:

controlling opening of a wastegate based on a third one of the target values;

controlling opening of an exhaust gas recirculation (EGR) valve based on a fourth one of the target values; and controlling intake and exhaust valve phasing based on fifth and sixth ones of the target values.

19. The engine control method of claim 11 further comprising adjusting the predetermined range for the first one of the target values from a first boundary to a second boundary of a predetermined range of actuation of an associated engine actuator.

20. The engine control method of claim 11 further comprising adjusting the predetermined range for the first one of the target values from a first boundary to a second boundary of a second predetermined range around the first one of the target values.

* * * * *